(12) United States Patent
Slocum et al.

(10) Patent No.: US 12,134,456 B1
(45) Date of Patent: Nov. 5, 2024

(54) INFLATABLE STRUCTURE LAUNCHING

(71) Applicant: LTAG SYSTEMS LLC, Bow, NH (US)

(72) Inventors: Jonathan T. Slocum, Bow, NH (US); Alexander H. Slocum, Bow, NH (US)

(73) Assignee: LTAG SYSTEMS LLC, Bow, NH (US)

( * ) Notice: Subject to any disclaimer, the term of this patent is extended or adjusted under 35 U.S.C. 154(b) by 0 days.

(21) Appl. No.: 18/110,352

(22) Filed: Feb. 15, 2023

Related U.S. Application Data

(60) Provisional application No. 63/310,124, filed on Feb. 15, 2022.

(51) Int. Cl.
*B64B 1/58* (2006.01)
*B64B 1/40* (2006.01)

(52) U.S. Cl.
CPC . *B64B 1/58* (2013.01); *B64B 1/40* (2013.01)

(58) Field of Classification Search
CPC .... B64B 1/40; B64B 1/58; B64B 1/62; B64B 1/64; B64B 1/70
See application file for complete search history.

(56) References Cited

U.S. PATENT DOCUMENTS

| | | |
|---|---|---|
| 3,014,689 A | 12/1961 | Söderström |
| 3,381,655 A | 5/1968 | Rozzelle |
| 3,402,738 A | 9/1968 | Perolo |
| 3,502,298 A | 3/1970 | Paddington |
| 3,554,707 A | 1/1971 | Holmes et al. |
| 3,575,381 A | 4/1971 | Gilmore |
| 4,586,456 A | 5/1986 | Forward |
| 4,944,242 A * | 7/1990 | Russell ............... B64B 1/50 116/210 |
| 4,982,929 A | 1/1991 | Spurling |
| 5,301,631 A | 4/1994 | Vining |

(Continued)

FOREIGN PATENT DOCUMENTS

| | | |
|---|---|---|
| CA | 2800795 A1 | 3/2013 |
| CN | 101198737 A | 8/2011 |

(Continued)

OTHER PUBLICATIONS

European Patent Office, Extended Search report dated Oct. 2018, in related European Patent Application No. 16804381.8 (7 Pages).

(Continued)

*Primary Examiner* — Tye William Abell
(74) *Attorney, Agent, or Firm* — THE MARBURY LAW GROUP PLLC

(57) ABSTRACT

According to one aspect, a system for launching an aerostat may include a reactor defining a chamber, an inflatable structure including a balloon and a neck, the balloon and the neck collectively defining a volume, a coupling defining a passage in fluid communication between the chamber of the reactor and the volume of the inflatable structure, the passage defining a longitudinal axis, and a collar supported on the reactor, the collar defining an orifice in fluid communication between the chamber of the reactor and the passage of the coupling, and the collar releasably restricting displacement of the passage of the coupling, the volume of the inflatable structure, and the chamber of the reactor relative to one another along the longitudinal axis.

19 Claims, 12 Drawing Sheets

(56) References Cited

U.S. PATENT DOCUMENTS

| | | | |
|---|---|---|---|
| 5,707,499 A * | 1/1998 | Joshi | H01M 50/121 |
| | | | 204/266 |
| 6,386,137 B1 | 5/2002 | Riche | |
| 6,506,360 B1 | 1/2003 | Andersen et al. | |
| 6,638,493 B2 | 10/2003 | Andersen et al. | |
| 6,648,272 B1 * | 11/2003 | Kothmann | B64B 1/58 |
| | | | 244/30 |
| 7,666,386 B2 | 2/2010 | Withers-Kirby et al. | |
| 8,418,435 B2 | 4/2013 | Hatoum | |
| 8,522,835 B2 | 9/2013 | McLean et al. | |
| 8,974,765 B2 | 3/2015 | Boyle et al. | |
| 9,090,323 B1 | 7/2015 | Ratner | |
| 10,745,789 B2 | 8/2020 | Slocum | |
| 11,111,141 B1 | 9/2021 | Slocum et al. | |
| 11,130,557 B1 | 9/2021 | Slocum et al. | |
| 11,148,947 B1 | 10/2021 | Slocum et al. | |
| 11,268,180 B2 | 3/2022 | Slocum | |
| 11,312,466 B1 | 4/2022 | Slocum et al. | |
| 11,318,437 B1 | 5/2022 | Slocum et al. | |
| 11,661,339 B1 | 5/2023 | Mahar et al. | |
| 11,772,062 B1 | 10/2023 | Slocum et al. | |
| 2003/0062444 A1 * | 4/2003 | Goodey | B64B 1/62 |
| | | | 244/24 |
| 2003/0235724 A1 | 12/2003 | Ord et al. | |
| 2007/0057116 A1 * | 3/2007 | Sinsabaugh | B64B 1/62 |
| | | | 244/96 |
| 2008/0193806 A1 | 8/2008 | Kulakov | |
| 2009/0127137 A1 | 5/2009 | Golz et al. | |
| 2010/0028255 A1 | 2/2010 | Hatoum | |
| 2010/0061923 A1 | 3/2010 | Reddy | |
| 2010/0068132 A1 | 3/2010 | Vencill et al. | |
| 2010/0112396 A1 | 5/2010 | Goldstein | |
| 2012/0100443 A1 | 4/2012 | Braithwaite et al. | |
| 2012/0107228 A1 | 5/2012 | Ishida et al. | |
| 2013/0004865 A1 | 1/2013 | Stimits et al. | |
| 2013/0028809 A1 | 1/2013 | Barton et al. | |
| 2014/0050625 A1 | 2/2014 | Zheng et al. | |
| 2014/0231132 A1 | 8/2014 | Watanabe | |
| 2014/0261132 A1 | 9/2014 | Zeren et al. | |
| 2016/0355918 A1 | 12/2016 | Slocum | |
| 2017/0022078 A1 | 1/2017 | Fukuoka | |
| 2018/0280743 A1 | 10/2018 | Walker | |
| 2019/0077510 A1 * | 3/2019 | Panas | G06F 16/2365 |
| 2019/0193913 A1 | 6/2019 | Takehara | |
| 2019/0201642 A1 | 7/2019 | Takehara | |
| 2019/0341637 A1 | 11/2019 | Fine et al. | |
| 2020/0088178 A1 | 3/2020 | Fukudome et al. | |
| 2020/0199727 A1 | 6/2020 | Slocum | |
| 2020/0199728 A1 | 6/2020 | Slocum | |
| 2020/0262536 A1 * | 8/2020 | Deakin | B64B 1/20 |
| 2020/0325045 A1 | 10/2020 | Fukuoka | |
| 2021/0061488 A1 | 3/2021 | Smithers et al. | |
| 2021/0115547 A1 | 4/2021 | Slocum | |
| 2021/0237843 A1 * | 8/2021 | Slocum | B64B 1/40 |
| 2023/0159149 A1 * | 5/2023 | Slocum | B64B 1/62 |
| | | | 244/31 |

FOREIGN PATENT DOCUMENTS

| | | |
|---|---|---|
| CN | 103608957 B | 3/2016 |
| EP | 2980352 A1 | 3/2016 |
| FR | 2914391 A1 | 10/2008 |
| GB | 2356184 A | 11/1999 |
| WO | 2016196718 A1 | 12/2016 |
| WO | 2021119628 A1 | 6/2021 |

OTHER PUBLICATIONS

Godart, Peter, "Design of an Aluminum-Powered Reverse Osmosis Desalination System for Disaster Relief," Massachusetts Institute of Technology, Department of Mechanical Engineering, Jun. 2019 (105 pages).

Godart Peter, "Mechanisms of Liquid-Metal-Activated Aluminum-Water Reactions and Their Application," Massachusetts Institute of Technology, Department of Mechanical Engineering, Sep. 2021 (351 pages).

Meroueh Laureen, "Effects of Doping and Microstructural Variables on Hydrogen Generated Via Aluminum-Water Reactions Enabled by a Liquid Metal," Ph.D. Thesis, Massachusetts Institute of Technology, Sep. 2020 (127 pages).

United States Patent and Trademark Office, "Notice of Allowance and Fee(s) Due," dated Jan. 25, 2022, in related U.S. Appl. No. 16/804,676 (25 pages).

United States Patent and Trademark Office, "Final Office Action," dated Jul. 14, 2022, in related U.S. Appl. No. 17/499,264 (17 pages).

United States Patent and Trademark Office, "Non-Final Office Action," dated Dec. 9, 2021 in related U.S. Appl. No. 17/499,264 (25 pages).

United States Patent and Trademark Office, "Notice of Allowance and Fee(s) Due," dated Mar. 8, 2023, in related U.S. Appl. No. 17/499,264 (25 pages).

United States Patent and Trademark Office, "Notice of Allowance and Fee(s) Due," dated Jun. 3, 2021, in related U.S. Appl. No. 17/014,593, (15 pages).

United States Patent and Trademark Office, "Notice of Allowance and Fee(s) Due," dated Jan. 22, 2021, in related U.S. Appl. No. 17/014,593, (19 pages).

United States Patent and Trademark Office, "Restriction Requirement," dated Dec. 8, 2020, in related U.S. Appl. No. 17/014,593, (7 pages).

United States Patent and Trademark Office, "Notice of Allowance and Fee(s) Due," dated Aug. 3, 2022, in related U.S. Appl. No. 17/685,765 (18 pages).

United States Patent and Trademark Office, "Notice of Allowance and Fee(s) Due," dated Dec. 16, 2022, in related U.S. Appl. No. 17/685,765 (10 pages).

United States Patent and Trademark Office, "Notice of Allowance and Fee(s) Due," dated Apr. 6, 2023, in related U.S. Appl. No. 17/685,765 (9 pages).

United States Patent and Trademark Office, "Restriction Requirement," dated Feb. 1, 2022, in related U.S. Appl. No. 17/475,320 (6 pages).

United States Patent and Trademark Office, Notice of Allowance and Fee(s) Due, dated Mar. 9, 2022, in related U.S. Appl. No. 17/475,320 (24 pages).

The U.S. Patent and Trademark Office, "Non-Final Office Action", issued in related U.S. Appl. No. 16/804,676, dated Jul. 21, 2021 (17 pages).

The U.S. Patent and Trademark Office, "Restriction Requirement", issued in related U.S. Appl. No. 17/243,528, dated dated Feb. 4, 2022 (7 pages).

The U.S. Patent and Trademark Office, "Notice of Allowance", issued in related U.S. Appl. No. 17/243,528, dated Mar. 9, 2022 (16 pages).

The U.S. Patent and Trademark Office, "Notice of Allowance", issued in related U.S. Appl. No. 17/685,765 dated Aug. 3, 2022 (18 pages).

The U.S. Patent and Trademark Office, "Notice of Allowance", issued in related U.S. Appl. No. 17/685,765 dated Apr. 6, 2023 (9 pages).

The U.S. Patent and Trademark Office, "Notice of Allowance", issued in related U.S. Appl. No. 17/685,765 dated Aug. 11, 2023 (10 pages).

* cited by examiner

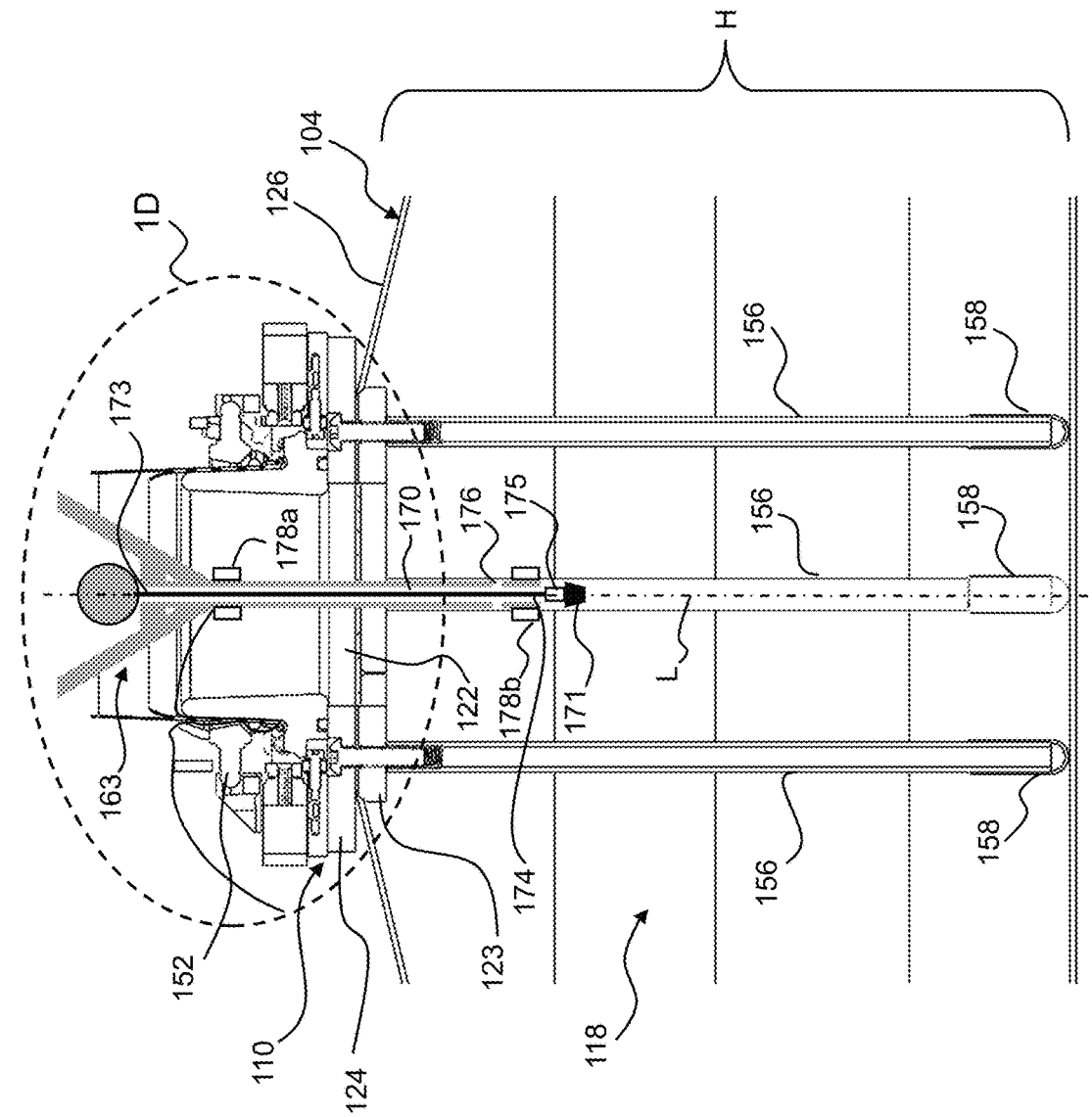

INFLATABLE STRUCTURE LAUNCHING

CROSS-REFERENCE TO RELATED APPLICATIONS

This application claims priority to U.S. Provisional Application 63/310,124, filed Feb. 15, 2022, the entire contents of which are hereby incorporated herein by reference.

GOVERNMENT LICENSE RIGHTS

This invention was made with government support under FA8702-15-D-0001 awarded by the United States Air Force. The government has certain rights in the invention.

BACKGROUND

Balloons can be filled with a lifting gas to allow the balloon to float in any one or more of various different media. As an example, balloons in the form of weather balloons are commonly used for meteorological observation. Such weather balloons provide localized weather conditions that may not be accurately measurable using ground-based measurements or satellite images.

The types of applications in which balloons are useful are, however, constrained by the resources and quality of lifting gases required to impart buoyancy to balloons. That is, the time and equipment required for inflation and launch can make balloons unsuitable for many implementations in the field, away from established infrastructure. Accordingly, there remains a need for balloon inflation that is robust across a variety of field conditions, while using equipment and resources amenable to transport and rapid deployment.

SUMMARY

According to one aspect, a system for launching an aerostat may include a reactor defining a chamber, an inflatable structure including a balloon and a neck, the balloon and the neck collectively defining a volume, a coupling defining a passage in fluid communication between the chamber of the reactor and the volume of the inflatable structure, the passage defining a longitudinal axis, and a collar supported on the reactor, the collar defining an orifice in fluid communication between the chamber of the reactor and the passage of the coupling, and the collar releasably restricting displacement of the passage of the coupling, the volume of the inflatable structure, and the chamber of the reactor relative to one another along the longitudinal axis.

In certain implementations, the collar may be independently releasable from mechanical engagement with each one of the coupling and the inflatable structure.

In some implementations, the coupling may include a body, a rim, and a yoke, the body having a first end portion and a second end portion, the passage defined by the body from the first end portion to the second end portion, the rim disposed along the first end portion and releasably coupled to the collar, and the yoke disposed along the second end portion and releasably coupled to the collar. As an example, the collar may define a recess, the yoke includes a pin extending radially away from the second end portion of the body of the coupling, and the pin positionable in the recess of the collar and, with the pin positioned in the recess, rotation of the yoke restricted about the longitudinal axis. In some instances, the collar may further include an arm movable from a first position over the recess to a second position away from the recess, the arm in the first position, with the pin positioned in the recess, restricting axial movement of the yoke in a direction away from the recess, and the yoke movable in the direction away from the recess with the arm in the second position and the pin positioned in the recess. Additionally, or alternatively, the system may further include a motor mechanically coupled to the collar, the motor actuatable to move the arm from the first position over the recess to the second position away from the recess. In some instances, the collar may include a plurality of cam locks, each cam lock including a respective cam, and each cam releasably engageable with the rim to secure the coupling in fluid communication with the chamber of the reactor via the orifice defined by the collar.

In certain implementations, the system may further include a valve including a funnel, a float, a tube, wherein the funnel is disposed in the volume of the inflatable structure, the tube is coupled to an apex portion of the funnel, the tube defines a channel, the float is movable in the funnel to control fluid communication between the funnel and the channel of the tube, and the tube extends from the volume of the inflatable structure and into the chamber of the reactor via the orifice of the coupling. The tube may define one or more radial holes axially spaced from the apex portion of the funnel, the one or more radial holes in fluid communication with the channel. Additionally, or alternatively, the valve may further include a rod and a cap, the rod has a first end section and a second end section, the first end section of the rod is coupled to the float, the second end section of the rod is coupled to the cap, at least a portion of the rod between the first end section and the second end section is disposed in the channel of the tube and movable within the channel of the tube, and the cap on the second end section of the rod limits axial movement of the rod within the tube to limit axial movement of the float within the funnel. The rod may have an outer diameter less than about two-thirds of an inner diameter of the tube. Further, or instead, the valve may include a sleeve disposed about the second end section of the rod, wherein the sleeve restrains radial movement of the rod within the channel while permitting axial movement of the rod within the channel. In certain instances, the system may further include a load line mechanically coupled to the funnel, wherein the funnel is movable within the volume of the inflatable structure with the volume of the inflatable structure in fluid communication with the chamber of the reactor via the passage of the coupling, and the funnel is seatable in the neck of the inflatable structure via load on the load line. The reactor may further include at least three legs disposed in the chamber, the at least three legs supporting the collar to maintain a minimum height dimension of the chamber of the reactor, and each one of the at least three legs is longer than the tube of the valve to support the tube of the valve in the chamber, away from surfaces of the reactor.

According to another aspect, a system for launching an aerostat may include a reactor defining a chamber, an inflatable structure including a balloon and a neck, the balloon and the neck collectively defining a volume, a coupling including a body and a yoke, the body defining a passage in fluid communication between the chamber of the reactor and the volume of the inflatable structure, the neck of the inflatable structure disposed between the yoke and the body, and the yoke and the neck defining an annular cavity therebetween, and a seal supported on the neck of the inflatable structure, the seal movable into the annular cavity as buoyancy of the inflatable structure pulls the neck of the inflatable structure upward.

In some implementations, the seal may be an O-ring rollable on an outside surface of the neck of the inflatable structure to move into the annular cavity defined between the yoke and the neck of the annular cavity.

In certain implementations, a first interface between the inflatable structure and the seal may have a first coefficient of friction, and a second interface between the inflatable structure and the coupling has a second coefficient of friction less than the first coefficient of friction.

In some implementations, the coupling may include a rim supported on the body and releasably secured in mechanical communication with the reactor, the yoke includes a plurality of standoffs circumferentially spaced from one another and engageable with the rim to limit axial movement of the yoke toward the rim with the seal supported on the neck of the inflatable structure. As an example, the coupling may include at least one peg extending radially away from the rim, and at least one of the standoffs defines a respective slot positionable about the at least one peg to key the yoke to a circumferential position with respect to the rim. Further, or instead, the system may include a latch supported on the yoke, wherein the latch is releasably engageable with the at least one peg and, with the latch releasably engaged with the at least one peg, axial movement of the yoke limited in a direction away from the rim of the coupling.

BRIEF DESCRIPTION OF THE FIGURES

FIG. 1C is a side view of a cross-section of the portion of the system shown in FIG. 1B, with the cross-section taken along 1C-1C in FIG. 1B.

Like reference symbols in the various drawings indicate like elements.

DETAILED DESCRIPTION

Figure 1A:
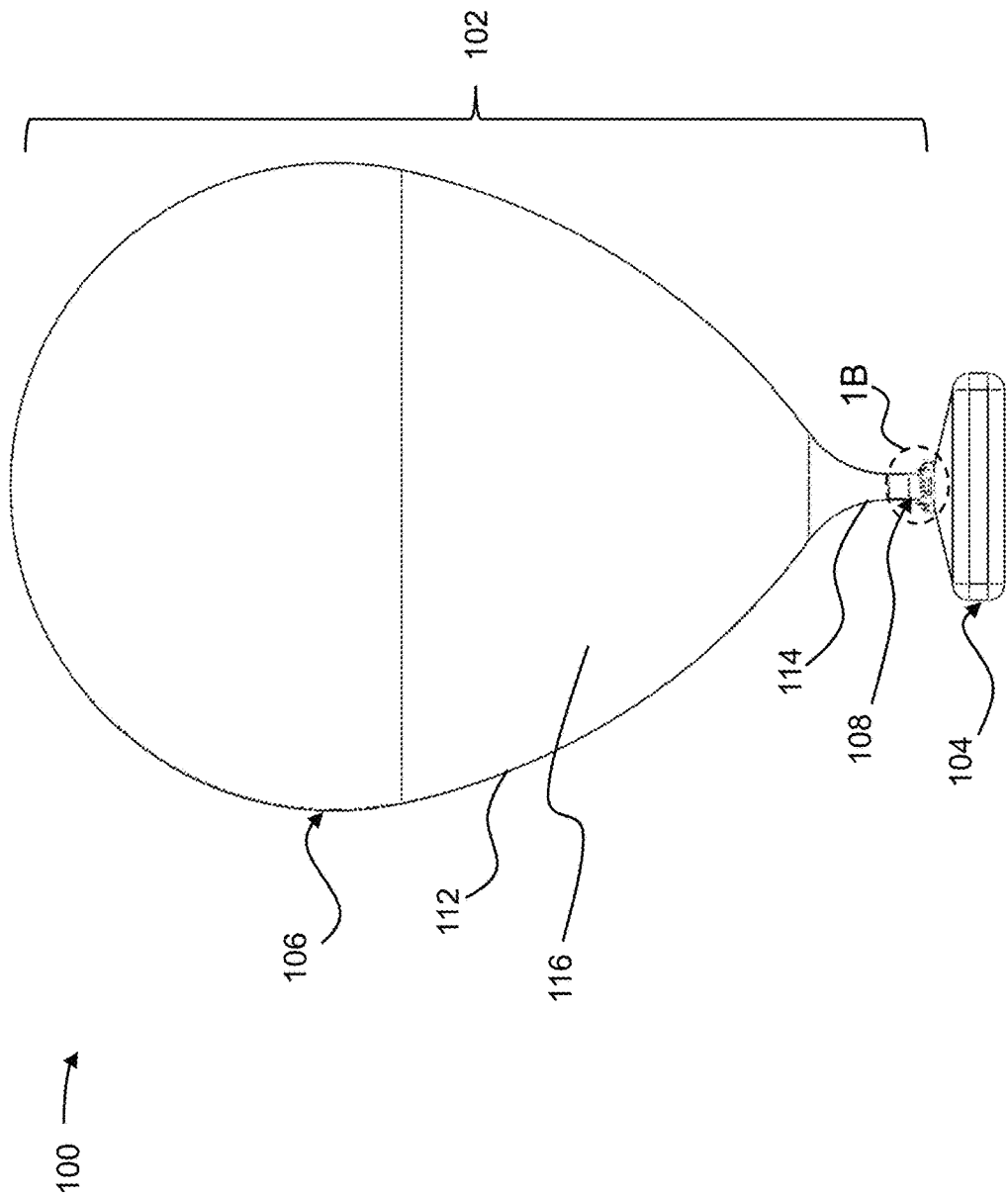
FIG. 1A is a side view of a system for launching an aerostat, with the system including a reactor, an inflatable structure, a coupling, and a collar.
Figure 1B:
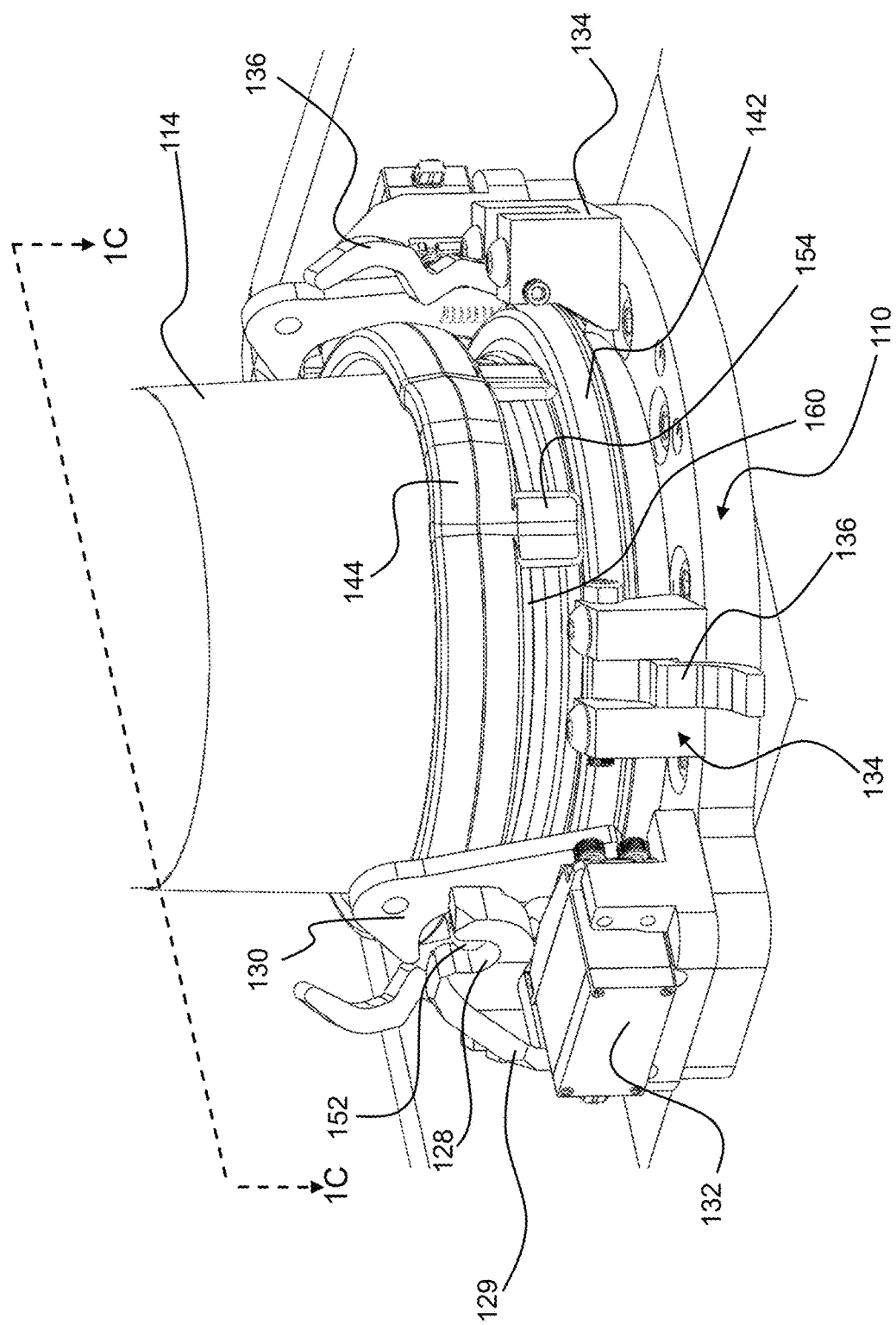
FIG. 1B is a close-up, perspective view of the system of FIG. 1A along the area of detail 1B in FIG. 1A.
Figure 1D:
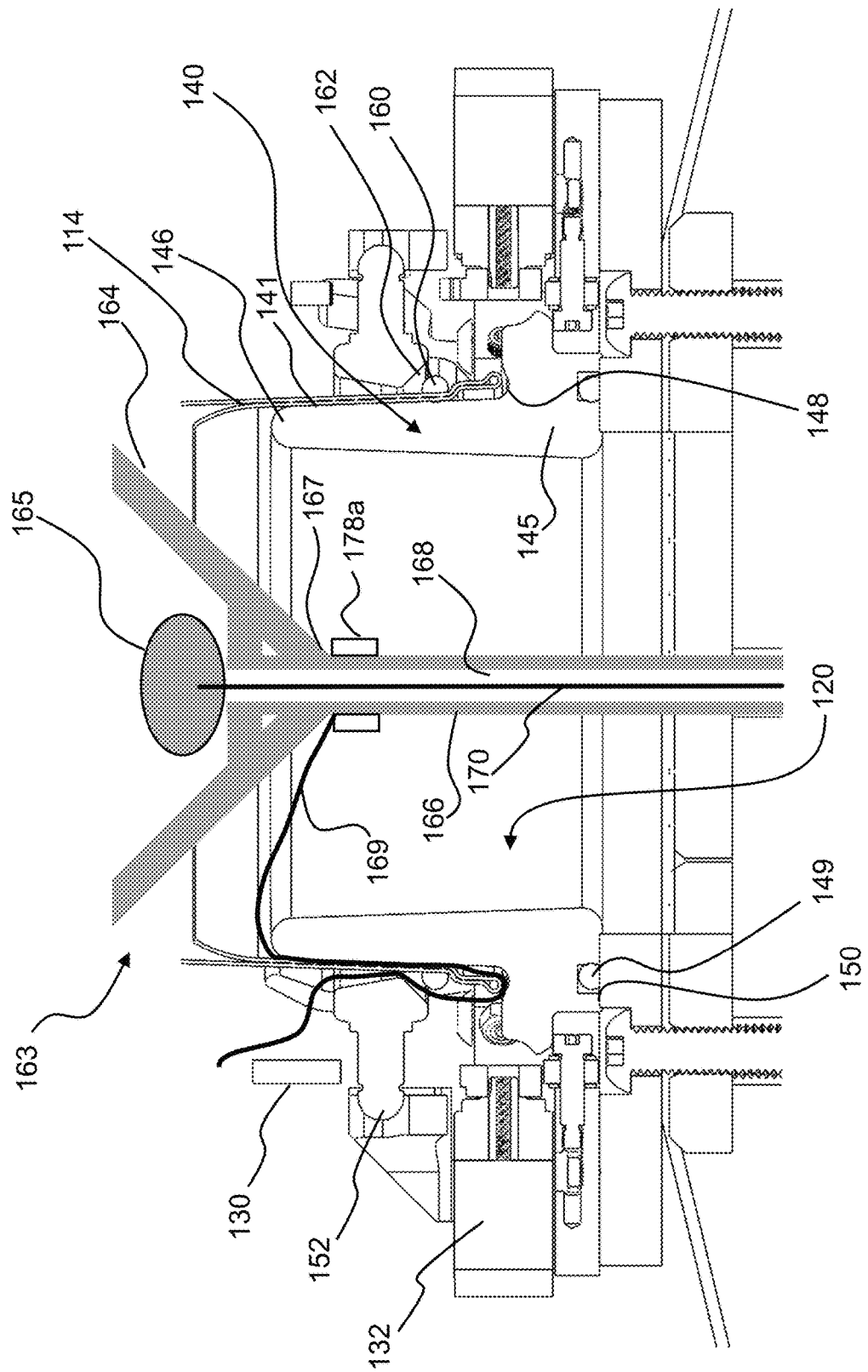
FIG. 1D is a close-up view, side view of the cross-section of the portion of the system in FIG. 1C along the area of detail 1C in FIG. 1C.

Embodiments will now be described more fully hereinafter with reference to the accompanying figures, in which exemplary embodiments are shown. The foregoing may, however, be embodied in many different forms and should not be construed as limited to the exemplary embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to explain the embodiments and does not pose a limitation on the scope of those embodiments. No language in the specification should be construed as indicating any unclaimed element as essential to the practice of the disclosed embodiments.

As used herein, the term "gas" or variants thereof (e.g., lifting gas) shall be understood to include a single component or multiple components (mixed), unless otherwise specified or made clear from the context. Further, unless a contrary intent is indicated, the use of the term gas shall be generally understood to include any multi-phase mixture that includes one or more gas phase components and exhibits characteristics of a compressible fluid, with a relationship between pressure, volume, and temperature that is accurately characterized by the ideal gas law to within about ±5 percent at room temperature at sea level. Thus, for example, a gas may include at least one gas phase component, as well as some amount of one or more vapor components (e.g., water vapor).

As used herein, the term "aerostat" shall be understood to include any one or more of various, different types of lighter-than-air aircraft that gain lift primarily from aerostatic lift, in contrast to aerodynes that primarily make use of aerodynamic lift requiring movement of a wing surface through air. In use cases described herein, an aerostat may contain a quantity of lifting gas such that the average density of the aerostat (containing the quantity of lifting gas) is less than or equal to the density of air at some altitude and, thus, the aerostat is at least neutrally buoyant in air for a period. Unmanned and unpowered aerostats are an important application for lifting gas and serve as useful examples for highlighting particular aspects of the devices, systems, and methods of the present disclosure. However, unless otherwise specified or made clear from the context, the term "aerostat" shall be understood to include any manner and form of object that can receive lifting gas to have at least some degree of buoyancy in air, whether in an indoor or an outdoor environment. Accordingly, as used herein, an aerostat may include any one or more of various, different manned or unmanned craft, dirigible or non-dirigible craft, independently propelled or floating craft, rigid or nonrigid craft, tethered or untethered craft, or combinations thereof. Further, it shall be understood that an aerostat includes at least an inflatable structure and may additionally include other elements, such as a payload and/or equipment for tethering to a payload. While this convention is used in the description that follows, it should generally be appreciated the inflatable structure relates to other elements of launching systems in the same way that the aerostat relates to such launching systems. Thus, for the sake of reducing unnecessary repetition, launching the inflatable structure and/or detaching the inflatable structure as described herein may be used interchangeably with launching the corresponding aerostat and/or detaching the corresponding aerostat unless otherwise specified or made clear from the context.

For the sake of clear and efficient description, elements with numbers having the same last two digits in the disclosure that follows shall be understood to be analogous to or interchangeable with one another, unless otherwise explicitly made clear from the context, and, therefore, are not described separately from one another, except to note differences or to emphasize certain features. Thus, for example, a system 100 and a system 200 shall be understood to be analogous to or interchangeable with one another, unless otherwise specified or made clear from the context.

Referring now to FIGS. 1A-1D, a system 100 for launching an aerostat 102 may include a reactor 104, an inflatable structure 106, a coupling 108, and a collar 110. The inflatable structure 106 may include a balloon 112 and a neck 114 collectively defining a volume 116, and the reactor 104 may define a chamber 118. The coupling 108 may define a passage 120 in fluid communication between the chamber 118 of the reactor 104 and the volume 116 of the inflatable structure 106. The collar 110 may be supported on the reactor 104, with the collar 110 defining an orifice 122 in fluid communication between the chamber 118 of the reactor 104 and the passage 120 of the coupling 108. As described in greater detail below, the collar 110 supported on the reactor 104 may releasably restrict displacement of the passage 120 of the coupling 108, the volume 116 of the inflatable structure 106, and the chamber 118 of the reactor 104 relative to one another along a longitudinal axis L defined by the passage 120 of the coupling 108. As compared to the using separate hardware pieces to limit relative displacement of each of the components of a fluid path, the use of the collar 110 to restrict axial displacement of the passage 120, the volume 116, and the chamber 118 relative to one another as described herein may facilitate easier transport of the system 100, faster assembly of the system 100, and/or more robust control over launching the aerostat 102 (e.g., lower likelihood of leaks). Stated differently, system 100 may be carried by a small number of personnel (e.g., as a disassembled kit of pre-assembled sections) to a field location, where the system 100 may be quickly set-up to deploy the inflatable structure 106 reliably, even under uncontrolled field conditions, making the system 100 particularly useful for use-cases that are not addressable with launch systems requiring larger and more complex hardware.

In use, as also described in greater detail below, the neck 114 of the inflatable structure 106 may be extended (e.g., stretched) over a portion of the coupling 108 to circumscribe the passage 120 of the coupling 108. Additionally, or alternatively, the coupling 108 may be positioned on the collar 110 to align chamber 118 of the reactor 104 and the passage 120 of the coupling 108 in fluid communication with one another via the orifice 122 of the collar 110. Through a first connection to the coupling 108, the collar 110 may restrict displacement of the passage 120 of the coupling 108 away from the chamber 118 reactor 104 in an axial direction parallel to the longitudinal axis L defined by the passage 120. Additionally, or alternatively, through a second connection to the coupling 108—the second connection spatially separated from the first connection—the collar 110 may restrict displacement of the volume 116 of the inflatable structure 106 away from the passage 120 of the coupling in the axial direction parallel to the longitudinal axis L defined by the passage 120. That is, from a position supported on the reactor 104, the collar 110 may provide consistent, stable, and rapid mechanical connections to the coupling 108 to restrict axial displacement of components of the system 100 forming a fluid path from the chamber 118 of the reactor to the volume 116 of the inflatable structure 106. With the system 100 so assembled, activated aluminum may be reacted with water in the chamber 118 of the reactor 104 to produce a hydrogen-containing lifting gas. The activated aluminum may include activated aluminum, such as set forth in U.S. Pat. No. 10,745,789, issued to Jonathan Thurston Slocum on Aug. 18, 2020, and entitled "Activated Aluminum Fuel," the entire contents of which are hereby incorporated herein by reference. The second connection between the collar 110 and the coupling 108 may be released, and buoyancy of the lifting gas in the inflatable structure 106 may lift the inflatable structure 106 in a direction away from the collar 110 and the reactor 104, and the inflatable structure 106 may float away to carry out a particular mission. Following launching of one or more instances of the aerostat 102, the coupling 108 may be rapidly released from the collar 110 (e.g., manually, without the use of tools), such as may be useful for packing sub-assemblies of the system 100 for transport.

In general, the collar 110 may be fixed to the reactor 104 to provide a rigid base useful for facilitating making and/or reliably releasing any one or more of the various different mechanical connections described herein while preserving the mechanical integrity of the reactor 104. That is, rigidity of the collar 110 may maintain consistent spacing relative to the coupling 108 to form and/or release the first connection and the second connection reliably with the coupling 108. For example, facilitated by rigidity that limits unintended mechanical transmission of forces, the collar 110 may be independently releasable from mechanical engagement with each one of the coupling 108 and the inflatable structure 106. Separability of the collar 110 from the coupling 108 may facilitate transporting the reactor 104 to remote locations in the field. For example, with the coupling 108 separated from the collar 110, it may be easier to fold the reactor 104 into a compact form factor with less of a risk of damaging the coupling 108 and/or the reactor 104 itself. Thus, continuing with this example, the collar 110 may be attachable to the coupling 108 near in time to the use of the reactor 104 to inflate the inflatable structure 106 for launching the aerostat 102. Further, or instead, the releasable separation of the coupling 108 from the collar 110 may facilitate repairing and replacing portions of the system 100 in the field. Additionally, or alternatively, releasable separation of the coupling 108 from the collar 110 may facilitate securing the inflatable structure 106 to the coupling 108 without the reactor 104 constraining movement of the coupling 108 and, thus, reducing the potential for damaging the reactor 104, the inflatable structure 106 as the system 100 is assembled in the field to launch the aerostat 102.

In certain instances, the collar 110 may be supported on the reactor 104 according to any one or more of various different techniques described in U.S. patent application Ser. No. 17/967,818, filed Oct. 17, 2022, and entitled "LIFTING GAS GENERATION," the entire contents of which are hereby incorporated herein by reference. For example, the collar 110 may include a first plate 123 and a second plate 124. The first plate 123 may be disposed in the chamber 118, and the second plate 124 may be disposed on an outer surface 126 of the reactor 104. The first plate 123 and the second plate 124 may be attached to one another (e.g., via bolts, other fasteners, and/or adhesive) with material of the reactor 104 therebetween such that the first plate 123 and the second plate 124 define the orifice 122 through the material of the reactor 104. Thus, while the reactor 104 may be foldable onto itself or otherwise compactable to facilitate transport, the collar 110 may remain in a fixed location on the outer surface 126 of the reactor 104 to facilitate proper and consistent positioning of the coupling 108 and the inflatable structure 106 relative to one another and relative to the chamber 118 of the reactor 104 to form a substantially fluid tight flow path for lifting gas to pass from the chamber 118 of the reactor 104 into the volume 116 of the inflatable structure 106 via the orifice 122 of the collar 110 and the passage 120 of the coupling 108.

In certain implementations, the collar 110 may define at least one instance of a recess 128 into which at least a portion of the coupling 108 is positionable (e.g., by lowering at least a portion of the coupling 108 into the recess 128). As an example, the collar 110 may include a bracket 129 mechanically coupled to the second plate 124 and extending in a direction away from the second plate 124, with the bracket 129 defining the recess 128 at a predetermined height above the second plate 124 to facilitate alignment of one or more features of the coupling 108 in the recess 128. With at least a portion of the coupling 108 disposed in the recess 128, the recess 128 may provide circumferential alignment of the collar 110 relative to the coupling 108, as may be useful for making mechanical connections between the collar 110 and the collar 110 with little or no potential for interference with one another and, in some cases, as a poka-yoke for such mechanical connections.

Further, or instead, the collar 110 may include one or more instances of an arm 130 movable from a first position over the recess 128 to a second position away from the recess 128. For example, the arm 130 may be pivotable from the first position over the recess 128 to the second position away from the recess 128. As described in greater detail below, with the coupling 108 positioned on the collar 110, the arm 130 in the first position over the recess 128 may restrict at least axial movement of a portion of the coupling 108, as may be useful for counteracting buoyancy force of the inflatable structure 106 to hold the volume 116 of the inflatable structure 106 in place relative to the reactor 104 and the coupling 108 as the volume 116 of the inflatable structure 106 is filled with lifting gas. As also described in greater detail below, with the coupling 108 positioned on the collar 110, the arm 130 in the second position away from the recess 128 may permit axial movement of the coupling 108 in a direction away from the collar 110 such that, in some cases, one or more portions the coupling 108 may be lifted out of the recess 128 under buoyancy force of the inflatable structure 106 filled with lifting gas to deploy the inflatable structure 106 for a given mission.

While the arm 130 may be manually movable (e.g., using a rope to pull the arm 130) from the first position over the recess 128 to the second position away from the recess 128, the arm 130 may be additionally or alternatively moved using other sources of mechanical force. For example, the system 100 may include a motor 132 in mechanical communication with the arm 130 and actuatable to move the arm 130 from the first position to the second position. As a more specific example, the motor 132 may be mechanically coupled to the collar 110 to facilitate accurate orientation of the motor 132 relative to the arm 130, as is useful for achieving efficient force transmission and/or repeatable motion of the arm 130 under a variety of conditions. Further, or instead, the motor 132 may be actuatable to move the arm 130 from the second position to the first position to reset the collar 110 between uses of the system 100. The motor 132 may be any one or more of various different types of electric motors and, in some instances, may be remotely actuatable by personnel overseeing inflation of the inflatable structure 106.

In certain implementations, the collar 110 may include a plurality of cam locks 134 that advantageously provide quick-connect and disconnect functionality and additionally, or alternatively, provide locking force facilitating achievement of a substantially gas-tight seal between the collar 110 and the coupling 108. Each cam lock 134 may include a cam 136 releasably engageable with a portion of the coupling 108, as described in greater detail below, to secure the coupling 108 to the collar 110. In particular, with the plurality of cam locks 134 releasably engaged with the coupling 108, axial displacement of a portion of the coupling 108 closest to the collar 110 may be restricted in a direction away from the collar 110. Thus, the releasable engagement of the cam locks 134 with the coupling 108 may facilitate maintaining the passage 120 of the coupling 108 in fluid communication with the chamber 118 of the reactor 104 via the orifice 122 defined by the collar 110. Additionally, or alternatively, releasable engagement of the cam locks 134 with the coupling 108 may hold at least a portion of the coupling 108 in place as the system 100 to facilitate rapid and reliable assembly of the system 100 in the field. Further, or instead, the plurality of cam locks 134 are manually operable, as is useful for assembling, operating, and disassembling the system 100 with little or no need to carry tools. The plurality of cam locks 134 may be circumferentially spaced apart from one another about a circumference of the coupling 108. As compared to a monolithic cam lock that circumscribes an entire circumference to be secured in place, the plurality of cam locks 134 may be more easily fabricated (e.g., without the need to injection mold a large cylindrical element).

In general, independent mechanical connections of the coupling 108 to the collar 110 supported on the reactor 104 and to the inflatable structure 106 may facilitate transporting the system 100 as a partially disassembled kit of subsystems that may be rapidly assembled in the field to achieve reliable and consistent inflation of the inflatable structure 106 to launch the aerostat 102. For example, the coupling 108 may be smaller and, thus, much more easily handled than each of the reactor 104 and the inflatable structure 106. That is, mechanical connection of the coupling 108 to the collar 110 may be carried out by a user manipulating the coupling 108 while the reactor 104 supporting the collar 110 remains generally stationary. Further, or instead, connection of the coupling 108 to the inflatable structure 106 may be carried out by a user manipulating the coupling 108 while the inflatable structure 106 remains generally stationary. As an example, with the inflatable structure 106 coupled to the coupling 108, the coupling 108 may be secured to the collar 110 to assemble the system 100 for operation. Additionally, or alternatively, independent mechanical connections of the coupling 108 to the collar 110 supported on the reactor 104 and to the inflatable structure 106 may facilitate filling the inflatable structure 106 quickly and, with the inflatable structure 106 filled with lifting gas, releasing the aerostat 102 while heavy components that are not intended for flight remain on the ground.

In certain implementations, the coupling 108 may include a body 140, a rim 142, and a yoke 144. The body 140 may have a first end portion 145 and a second end portion 146, with the passage 120 of the coupling 108 defined from the first end portion 145 to the second end portion 146 of the body 140. As described in greater detail below, the rim 142 may be disposed (e.g., in a fixed position) along the first end portion 145 of the body 140 and releasably securable to the collar 110. As also described in greater detail below, the yoke 144 may be disposed along the second end portion 146 and axially movable along at least a portion of an outer surface 141 of the body 140. The yoke 144 may also be releasably securable to the collar 110. Thus, as may be appreciated from the foregoing, the collar 110 is releasably securable to two different portions of the coupling 108, as is useful for facilitating rapid assembly of the system 100 and controllable and consistent release of the inflatable structure 106 to launch the aerostat 102.

In certain implementations, the rim 142 may include a ridge 148 (e.g., a surface having an arcuate profile in cross-section) circumscribing the passage 120 of the coupling 108. The cam 136 of each one of the plurality of cam locks 134 may be rotatable in a first direction into releasable engagement with the ridge 148 of the rim 142 to secure the passage 120 of the coupling 108 in fluid communication with the chamber 118 of the reactor 104 via the orifice 122 of the collar 110. Further, or instead, the cam 136 of each one of the plurality of cam locks 134 may be rotatable in a second direction (opposite the first direction) to release the respective instance of the cam 136 from the rim 142 such that the coupling 108 may be mechanically decoupled from the collar 110 along the rim 142 and, if the collar 110 is mechanically disengaged from the yoke 144, the coupling 108 may be removed from the collar 110.

The coupling 108 may include a sealing material on a face of the rim 142 to facilitate forming a fluid tight seal between the coupling 108 and the collar 110 as the plurality of cam locks 134 are engaged to lock the coupling 108 in place on the collar 110. As an example, the coupling 108 may include an O-ring 149 on a surface 150 of the rim 142 (e.g., in a groove defined by the surface 150) facing the second plate 124 of the collar 110. The releasable securement of the coupling 108 to the collar 110 along the rim 142 may include compressing the O-ring 149 between the rim 142 and the second plate 124 of the collar 110, as may be useful for reducing the potential for the lifting gas 121 to leak from the reactor 104 instead of being directed into the volume 116 of the inflatable structure 106.

In general, the neck 114 of the inflatable structure 106 may be disposed between the yoke 144 and the body 140 (e.g., according to any one or more of various different rolling interface techniques described in U.S. patent Ser. No. 17/891,108, filed Aug. 18, 2022, and entitled "BUOYANT TENSIONING FOR AEROSTAT LAUNCHING"), the entire contents of which are hereby incorporated herein by reference. For example, friction between the neck 114 of the inflatable structure 106 and the body 140 and friction between the neck 114 of the inflatable structure 106 and the yoke 144 may restrict movement of the inflatable structure 106 in an axial direction away from the coupling 108, thus facilitating maintaining fluid communication between the chamber 118 of the reactor 104 and the volume 116 of the inflatable structure 106 via the orifice 122 of the collar 110 and the passage 120 of the coupling 108.

To augment resistance to premature axial movement of the neck 114 of the inflatable structure 106 pinched between the yoke 144 and the second end portion 146 of the body 140, the yoke 144 may include one or more features releasably engageable with the collar 110 supported on the reactor 104. That is, the mechanical connection of the collar 110 along the yoke 144 may facilitate maintaining the yoke 144 in a substantially consistent position, even as buoyancy of the inflatable structure 106 increases in response to lifting gas moving into the volume 116 of the inflatable structure 106. Further, or instead, the yoke 144 may include one or more features that resist unintended rotational movement of the neck 114 of the inflatable structure 106 pinched between the yoke 144 and the second end portion of the body 140, as may be useful for reducing the likelihood of weakening or tearing the neck 114 of the inflatable structure 106 and/or reducing the likelihood of entanglement of lines attached to the inflatable structure 106.

As an example, the yoke 144 may include one or more instances of a pin 152 extending radially away from the second end portion 146 of the body 140 of the coupling 108. With the arm 130 of the collar 110 in the second position away from the recess 128 defined by the collar 110, the yoke 144 may be movable onto the body 140 to circumscribe the second end portion 146 of the body 140. As the yoke 144 is moved onto the body 140, the pin 152 may be lowered into the recess 128 to restrict rotation of the yoke 144 about the longitudinal axis L such that the yoke 144 may remain circumferentially aligned with the collar 110 in a predetermined position to facilitate assembly of the system 100. Further, or instead, as the pin 152 of the yoke 144 is positioned in the recess 128 of the collar 110, it shall be appreciated that the recess 128 of the collar 110 limits axial movement of the yoke 144 in an axial direction toward the collar 110, as may be useful for reducing the likelihood of unintended damage (e.g., crushing) of components as the yoke 144 is moved onto the second end portion 146 of the body 140.

Continuing with this example, with the pin 152 positioned in the recess 128, the arm 130 in the first position over the recess 128 may restrict axial movement of the yoke 144 in a direction away from the recess 128, thus maintaining the yoke 144 disposed about the second end portion 146 of the body 140 to hold the inflatable structure 106 in fluid communication with the chamber 118 of the reactor 104 as buoyancy of the inflatable structure 106 increases as lifting gas flows into the volume 116 of the inflatable structure 106. Similarly, with the pin 152 positioned in the recess 128, the yoke 144 may be movable in an axial direction away from the recess 128. Thus, for example, the aerostat 102 may be launched by moving the arm 130 from the first position over the recess 128 to the second position away from the recess 128 such that buoyancy force of the inflatable structure 106 lifts the yoke 144 and the neck 114 of the inflatable structure 106 off of the body 140 of the coupling 108 to release the aerostat 102 from the coupling 108.

In certain implementations, the arm 130 may engage the pin 152 with rolling contact between the arm 130 and the pin 152. As an example, in instances in which the arm 130 is pivotable, the pivot point of the arm 130 may be located to form an over center trigger that is safe (e.g., unlikely to be inadvertently released and progresses smoothly) and yet easily releasable. Among other things, such a smooth release—characterized by gradual changes in force pulling the neck 114 of the inflatable structure 106 away from the body 140 of the coupling 108—may reduce the likelihood of unintended tearing of the inflatable structure 106 and/or unintended jostling or entanglement of a payload carried by the aerostat 102.

While a single instance of the recess 128 and the pin 152 has been described as locating the yoke 144 relative to the collar 110 and a single instance of the arm 130 has been described as movable to control movement of the pin 152 from the recess 128, it shall be appreciated that this is for the sake of clear and efficient description. Unless otherwise indicated, or made clear from the context, additional instances of the recess 128, the arm 130, and the pin 152 may be used to locate the yoke 144 relative to the collar 110 and/or control positioning of the yoke 144, as may be useful for distributing forces across the yoke 144, among other things.

In some implementations, the yoke 144 may include a plurality of standoffs 154 circumferentially spaced from one another about an outer circumference of the yoke 144 and engageable with the rim 142. As the yoke 144 moves, along the outer surface 141 of the body 140 of the coupling 108, the plurality of standoffs 154 may limit axial movement of a portion of the yoke 144 toward the rim 142. In particular, a portion of the yoke 144 that engages the neck 114 of the inflatable structure 106 may be supported above the rim 142 by the plurality of standoffs 154, as may be useful for reducing the likelihood that components supported on the body 140, between the rim 142 and the yoke 144, may become crushed or otherwise damaged. For example, as described in greater detail below, a seal may be positioned between the rim 142 and the portion of the yoke 144 that engages the neck 114 of the inflatable structure 106 in some instances, and the standoffs 154 may be useful for reducing the likelihood of inadvertently damaging the seal as components of the system 100 are assembled.

In general, the reactor 104 may be any one or more of various different types of containers that—at least along the chamber 118—withstands temperatures and pressures associated with forming hydrogen-containing lifting gas through reaction of activated aluminum and water and may include any one or more of various different aspects of reactors described in U.S. patent application Ser. No. 17/967,818, filed Oct. 17, 2022, and entitled "LIFTING GAS GENERATION," the entire contents of which are hereby incorporated herein by reference. the entire contents of which are hereby incorporated herein by reference. For example, the reactor 104 may be flexible to fold or otherwise compact, such as a pillow tank. Additionally, or alternatively, the reactor 104 may be formed of a flexible high-temperature plastic (e.g., XR-5 high density polyethylene (HDPE)), as may be useful for using the reactor 104 on a variety of surfaces (e.g., asphalt, sand, concrete, brush, etc.) with a reduced likelihood of perforating or tearing as compared to other types of plastic material.

In certain implementations, the reactor 104 may include at least three legs 156 disposed in the chamber 118 to maintain a shape of the reactor 104 at least in initial stages of reaction of activated aluminum and water in the chamber 118 to form hydrogen-containing lifting gas. For example, the at least three legs 156 may support the weight of the collar 110 (and any hardware attached to the collar 110) above the chamber 118 to maintain a minimum height dimension H of the chamber 118 to reduce the likelihood of ejecta escaping from the chamber 118 into the passage 120 of the coupling 108 and/or into the volume 116 of the inflatable structure 106, where the ejecta may cause damage. Since the reaction of activated aluminum and water produces a large amount of gas while the reactants are still in a fluid-solid state, the minimum height dimension H may further, or instead, reduce the likelihood of splashing reactants from leaving the chamber 118 (e.g., when activated aluminum and water fill the chamber 118 to about one-half of the minimum height dimension H). Additionally, or alternatively, the chamber 118 may have a wide and shallow aspect ratio that may be useful for reducing the likelihood of bubbling of the reaction from pushing a large volume of reactants up toward the passage 120 of the coupling 108 in a mud geyser effect. Further, or instead, the at least three legs 156 may reduce the likelihood of the reactor 104 inadvertently tipping (e.g., in windy conditions). While the at least three legs 156 may facilitate maintaining the minimum height dimension H and reduce the likelihood of tipping, it shall be appreciated that one or more supports external to the chamber 118 of the reactor 104 may additionally, or alternatively, be used. However, as compared to such external supports, the at least three legs 156 in the chamber 118 may facilitate portability of the system 100. Each one of the at least three legs 156 may be, for example, ¼" pipe tapped at one end with a ⅜-16 tap to thread onto the end of bolts protruding from the collar 110 into the chamber 118 of the reactor 104.

In certain instances, the reactor 104 may be thermally conductive at least along the chamber 118 to facilitate controlling the reaction of activated aluminum and water in the chamber 118. Continuing with this example, the reactor 104 may be placed in contact with a heat sink (e.g., a pool of water, snow, or a large metal surface such as the deck of a boat) to react the activated aluminum with water to produce hydrogen-containing lifting gas containing less steam than hydrogen-containing lifting gas formed without such cooling.

While the neck 114 of the inflatable structure 106 radially positioned between the body 140 and the yoke 144 of the coupling 108 may be restrained from moving away from the coupling 108 through one or more respective interfaces with the body 140 and the yoke 144, radial pinching force between the body 140 and the yoke 144, or a combination thereof, other types of forces may be additionally or alternatively used to retrain axial movement of the neck 114 of the inflatable structure in a direction of the coupling 108 to reduce the likelihood of unintended release of the inflatable structure 106.

For example, the system 100 may additionally, or alternatively, include a seal 160 supported on the neck 114 of the inflatable structure 106. In particular, with the neck 114 of the inflatable structure 106 disposed between the yoke 144 and the body 140, the yoke 144 and the neck 114 may define an annular cavity 162 therebetween. Continuing with this example, the seal 160 supported on the neck 114 of the inflatable structure 106 may be movable into the annular cavity 162 as buoyancy of the inflatable structure 106 pulls the neck 114 of the inflatable structure 106 upward. That is, as buoyancy of the inflatable structure 106 pulls the inflatable structure 106 in an axial direction away from the coupling 108, the seal 160 may be pulled tighter into the annular cavity 162. This, in turn, provides increased resistance to axial movement of the inflatable structure 106, reducing the likelihood of premature release of the inflatable structure 106 before the arm 130 is moved from the first position above the recess 128 to the second position away from the recess 128 to release the inflatable structure 106 via release of the yoke 144.

In certain implementations, the seal 160 may be formed of a compliant material that is compressible onto the neck 114 of the inflatable structure 106 as the seal 160 moves into the annular cavity 162. As an example, the yoke 144 may have a beveled edge along the annular cavity 162 such that, as the seal 160 moves into the annular cavity 162 in an axial direction from the rim 142 toward the yoke 144, the beveled edge of the yoke 144 provides increasing radial force on the seal 160 to create a self-locking wedge that reduces the likelihood of the neck 114 of the inflatable structure 106 pulling away from the coupling 108 prematurely. As an example, the seal 160 may be an O-ring rollable on an outside surface of the neck 114 of the inflatable structure 106 to move into the annular cavity defined between the yoke and the neck of the annular cavity. In this context, it shall be understood that the outside surface of the neck 114 is a surface facing away from the outer surface 141 of the body 140 and toward the yoke 144.

In some instances, a first interface between the seal 160 and the neck 114 of the inflatable structure 106 has a first coefficient of friction, and a second interface between the neck 114 of the inflatable structure 106 and the coupling 108 (e.g., the second end portion 146 of the body 140 of the coupling 108) has a second coefficient of friction different from the first coefficient of friction. For example, the second coefficient of friction may be less than the first coefficient of friction, as is useful to balance the competing considerations of ease of placing the neck 114 of the inflatable structure 106 over the second end portion 146 of the body 140 while restricting unintended axial movement of the neck 114 of the inflatable structure 106 away from the coupling 108 as buoyancy of the inflatable structure 106 increases. As a specific example, the second interface between the neck 114 of the inflatable structure 106 and the coupling 108 may be lubricated with a fine powder (e.g., baby powder), and the neck 114 of the inflatable structure 106 may be placed over the second end portion 146 of the body 140 of the coupling 108. With the neck 114 of the inflatable structure 106 in place over the second end portion 146 of the body 140, the seal 160 and the outside surface of the neck 114 of the inflatable structure 106 may be cleaned (e.g., using alcohol) to remove any excess amounts of the fine powder and increase friction at the second interface.

The system 100 may, in some instances, include a valve 163 including a funnel 164, a float 165, and a tube 166. The funnel 164 may be disposed in the volume 116 of the inflatable structure 106. The 166 may be coupled to an apex portion 167 of the funnel 164, and the tube 166 may define a channel 168 extending away from the apex portion 167 of the funnel 164. The float 165 may be movable in the funnel 164 to control fluid communication between the funnel and the tube 166 to release condensed moisture from the volume 116 of the inflatable structure 106 while the aerostat 102 is in flight. With movement of the float 165 in the funnel 16 acting as a gas-tight seal to release condensed moisture from the volume 116 while retaining lifting gas in the volume 116.

The valve 163 may, in some instances, be pre-assembled for insertion of the funnel 164 into the volume 116 of the inflatable structure 106. For example, in instances in which the neck 114 of the inflatable structure 106 is 5 cm, the neck 114 of the inflatable structure 106 may be stretchable to accommodate a 15 cm diameter of the mouth of the funnel 164 which will then not pull through in the opposite direction with a 25 pound payload. The tube 166 may be a 0.5" OD×0.4" ID aluminum tube threaded with a ½-20 die to engage the apex portion 167 of the funnel 164. In certain implementations, the funnel 164 may be formed of a high temperature plastic. However, to reduce the likelihood that a high steam flow rate may soften the funnel 164, the funnel 164 may be formed of metal, such as lightweight aluminum.

With the inflatable structure 106 mounted on the coupling 108 according to the various different techniques described herein, the tube 166 may extend from the volume 116 of the inflatable structure 106 into the chamber 118 of the reactor 104. For example, as lifting gas flows from the chamber 118 of the reactor 104 into the volume 116 of the inflatable structure 106, the funnel 164 may be unseated from the neck 114 of the inflatable structure 106. The tube 166 extending into the chamber 118 of the reactor 104 may reduce the amount of movement of the valve 163 within the volume 116 as high flow rates of lifting gas buffet the funnel 164 away from seating in the neck 114 of the inflatable structure 106 as the volume 116 of the inflatable structure 106 is filled with lifting gas. Each one of the at least three legs 156 in the chamber 118 of the reactor 104 may be longer than the tube 166 of the valve 163 to support the tube 166 of the valve 163 in the chamber 118, away from surfaces of the reactor 104 along the chamber 118.

The maximum diameter of the funnel 164 may be greater than about 10 percent and less than about 50 percent larger than the inner diameter of the second end portion 146 of the body 140 to reduce the likelihood of the funnel 164 falling into the passage 120 of the body 140 or seating too low in the neck 114 of the inflatable structure 106 to become seated in the neck 114 of the inflatable structure 106 when flowrate of lifting gas slows and/or when the inflatable structure 106 is released from the coupling 108. As the inflatable structure 106 is released from the coupling 108, a load on a load line 169 attached to the valve 163 may pull the funnel 164 into a seated position in the neck 114 of the inflatable structure 106. when the balloon is released, the funnel drops into and contacts the balloon neck to anchor the balloon to a load or tether attached to a load line connected to the funnel system. The greater the load, the greater the sealing of the funnel to the balloon.

The float 165 may be retained in the funnel 164 according to any one or more of various different techniques. For example, the valve 163 may further include a rod 170 and a cap 171. The rod 170 may have a first end section 173 and a second end section 174. The first end section 173 may be coupled to the float 165, and the second end section 174 may be coupled to the cap 171. At least a portion of the rod 170 between the first end section 173 and the second end section 174 may be disposed in the channel 168 of the tube 166 and movable at least axially within the channel 168 defined by the tube 166. The cap 171 on the second end section 174 of the rod 170 may limit axial movement of the rod 170 within the tube 166, thus limiting axial movement of the float 165 within the funnel 164 while allowing moisture to flow from the funnel 164 into the channel 168 and out of the tube 166 when the float 165 is unseated from the apex portion 167 of the funnel. For example, the rod 170 may have an outer diameter less than about two-thirds of an inner diameter of the tube 166 along the channel 168 to reduce the likelihood of the rod 170 interfering with draining condensation from the channel 168. The float 165 may be a 2" diameter hollow stainless steel ball with an 8/32 threaded hole. The rod 170 may be a 12" long 8-32 aluminum threaded rod, and the cap 171 may be an acorn nut on the second end section 174 of the rod 170 to limit upwards travel of the float to about ¾".

In certain implementations, axial motion of the float 165 within the funnel 164 may be dampened using hydrodynamic drag enhancing features within the channel and/or a spongy seal material along the apex portion 167 of the funnel 164. Additionally, or alternatively, a steep thread on the rod 170 may rub the tube 166 along the channel 168 so that oscillating motions produced by the aerostat 102 while tethered will be less likely to unseat the float 165 from the apex portion 167 of the funnel 164 and allow contents of the volume 116 of the inflatable structure 106 to escape prematurely. Additionally, or alternatively, the valve 163 may include a sleeve 175 disposed about the second end section 174 of the rod 170 such that the sleeve 175 may restrain radial movement of the rod 170 within the channel 168 while permitting axial movement of the rod 170 within the channel 168.

In general, condensed moisture may down the channel 168 from the funnel 164 under the force of gravity when condensed moisture in the funnel 164 lifts the float 165 away from the apex portion of the funnel 164 to open the valve 163. The condensed moisture in the channel 168 may flow past the cap 171 to flow out of the channel 168 in some instances. Further, or instead, the tube 166 may define one or more radial holes 176 axially spaced from the apex portion 167 of the funnel 164 and in fluid communication with the channel 168. Thus, condensed moisture may flow out of the channel 168 through the one or more radial holes 176 independent of the position of the cap 171 relative to the tube 166. The one or more radial holes 176 may be about 10 to 11 inches away from the apex portion 167 of the funnel 164 typically 10-11" away. Additionally, or alternatively, the one or more radial holes 176 may be at least four ¾ "holes.

In some implementations, the load line 169 may be mechanically coupled to the funnel 164. The funnel 164 may be movable within the volume 116 of the inflatable structure 106 with the volume 116 of the inflatable structure in fluid communication with the chamber 118 of the reactor 104 via the passage 120 of the coupling 108. Additionally, or alternatively, the funnel 164 (e.g., the apex portion 167 of the funnel 164) may be seatable in the neck 114 of the inflatable structure 106 via load on the load line 169.

As an example, the valve 163 may include a first clamping collar 178a clamped about the tube 166 near (about 1-2 inches below) the apex portion 167 of the funnel 164. The load line 169 may be threaded through the first clamping collar 178a and ends of the load line 169 may be tied together with a bowline knot. Additionally, or alternatively a second clamping collar 178b may be clamped about the tube 166 near the radial holes 176, and the load line 169 may be additionally, or alternatively, secured to the second clamping collar 178b. The load line 169 may, as an example, then follow a path between the neck 114 of the inflatable structure 106 and the outer surface 141 of the body 140 to an environment outside of the system 100. and the coupling, hence the preferred flat profile to minimize lifting gas leakage. As the inflatable structure 106 is released from the coupling 108 according to any one or more of the various different techniques described herein, a load (e.g., a payload) on the load line 169 may pull the apex portion 167 of the funnel 164 into the neck 114 of the inflatable structure 106. As load increases, sealing between the apex portion 167 of the funnel 164 and the neck 114 of the inflatable structure 106 improves, thus achieving high reliability.

While a coupling has been described as limiting axial motion of a yoke through mechanical engagement with a collar, other approaches to limiting axial motion of a yoke of a coupling are additionally or alternatively possible.

For example, referring now to FIGS. 2A-2G, a system 200 for launching an aerostat (e.g., the aerostat 102 in FIGS. 1A-1D) may include a reactor 204, an inflatable structure 206, and a coupling 208. The coupling 208 may include a body 240, a rim 242, and a yoke 244. The body 240 may define a passage 220 in fluid communication between the reactor 204 and the inflatable structure 206 to fill the inflatable structure 206 with lifting gas according various different techniques described herein.

The rim 242 may extend radially from the body 240, and at least one peg 279 may extend radially from the rim 242. The yoke 244 may be releasably engageable to the at least one peg 279 extending from the rim 242 to restrict axial motion of the yoke 244. For example, the system 200 may include a latch 280 supported on the yoke 244 and releasably engageable with the at least one peg 279. The latch 280 may be pivotable relative to the yoke 244 and hang down to remain engaged with the at least one peg 279. The interface between the latch 280 and the at least one peg 279 may be shaped for rolling contact along concave arcs with centers at the about a pivot point of the latch 280. The engagement may be slightly (e.g., about 5 degrees) over center to make for a stable trigger, but one that is readily releasable by a person pulling a string or an actuator such as a motorized release arm, even under the large force of the inflatable structure 206 fully filled and pulling upwards. As an example, rolling may be achieved with good efficiency by a ⅜" OD×0.19" ID (2:1 ratio) plastic bushing on a shoulder screw that has been threaded into the side of the coupling. With the latch 280 releasably engaged with the at least one peg 279, axial movement of the yoke 244 may be limited in a direction away from the rim 242 of the coupling 208. Unless otherwise specified or made clear from the context, it shall be understood that the yoke 244 may restrict axial movement of the inflatable structure 206 according to any one or more of the various different techniques described herein. Accordingly, axial restriction of movement of the yoke 244 through releasable engagement of the at least one peg 279 may correspondingly restrict movement of the inflatable structure 206 in an axial direction away from the rim 242 of the coupling 208 such that the inflatable structure 206 may remain in fluid communication with the reactor 204 via the passage 220 as the inflatable structure 206 is filled with lifting gas in preparation for launching an aerostat.

The yoke 244 may include one or more standoffs 254 engageable in contact with the rim 242 to restrict axial movement of the yoke 244 in a direction toward the rim 242, as may be useful for reducing the likelihood of damaging a seal 260 disposed between the yoke 244 and the rim 242 and into a cavity at least partially defined by the yoke 244 to restrict movement of the inflatable structure 206 according to any one or more of the various different techniques described herein. Additionally, or alternatively, at least one of the one or more standoffs 254 may define a slot 281 positionable about the at least one peg 279 to key the yoke 244 to a circumferential position with respect to the rim 242 to provide a poka-yoke for positioning the yoke 244 relative to the at least one peg 279.

Figure 2A:
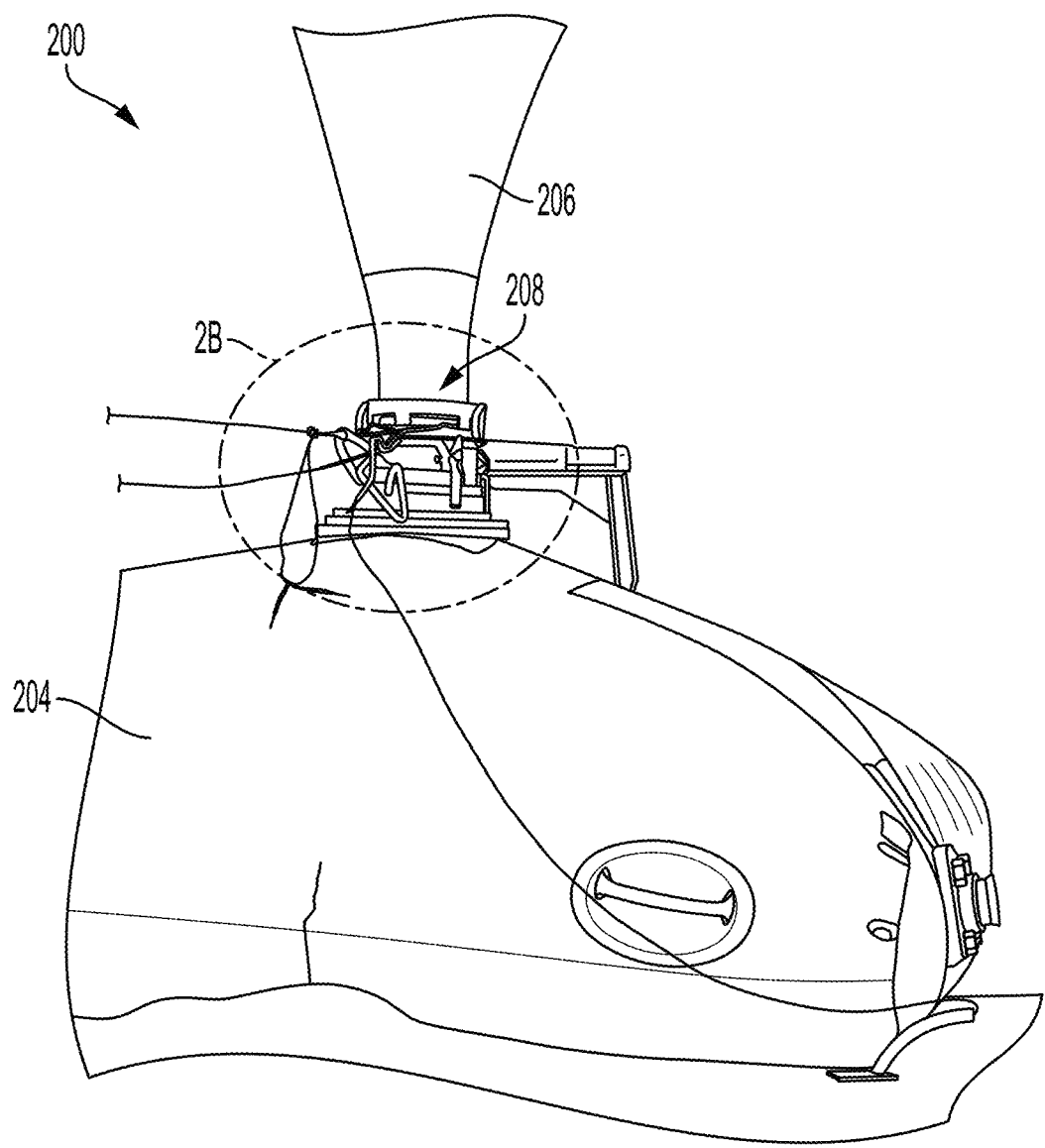
FIG. 2A is a perspective view of a portion of a system for launching an aerostat, with the system including a reactor, an inflatable structure, and a coupling.
Figure 2B:
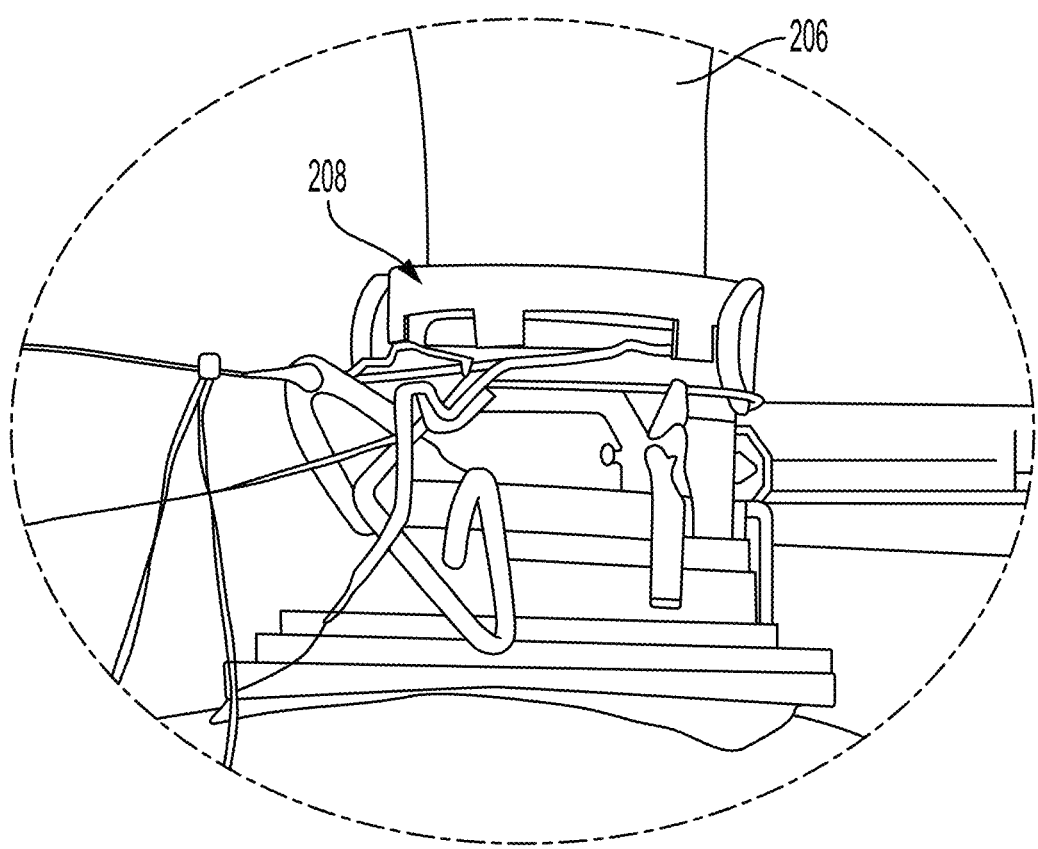
FIG. 2B is a close-up of a portion of the system of FIG. 2A along area of detail 2B in FIG. 2A.
Figure 2C:
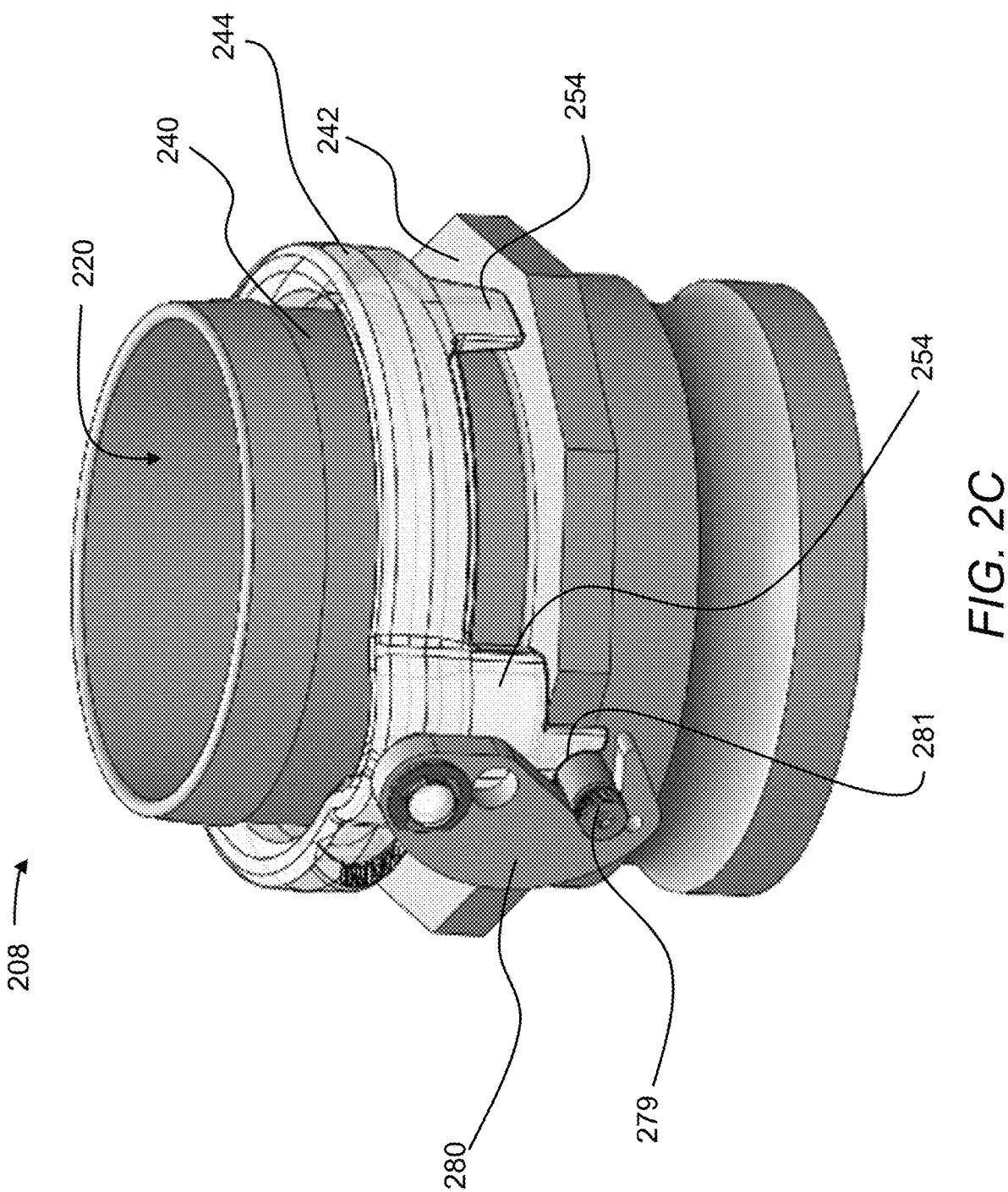
FIG. 2C is a perspective view of the coupling of the system of FIG. 2A.
Figure 2D:
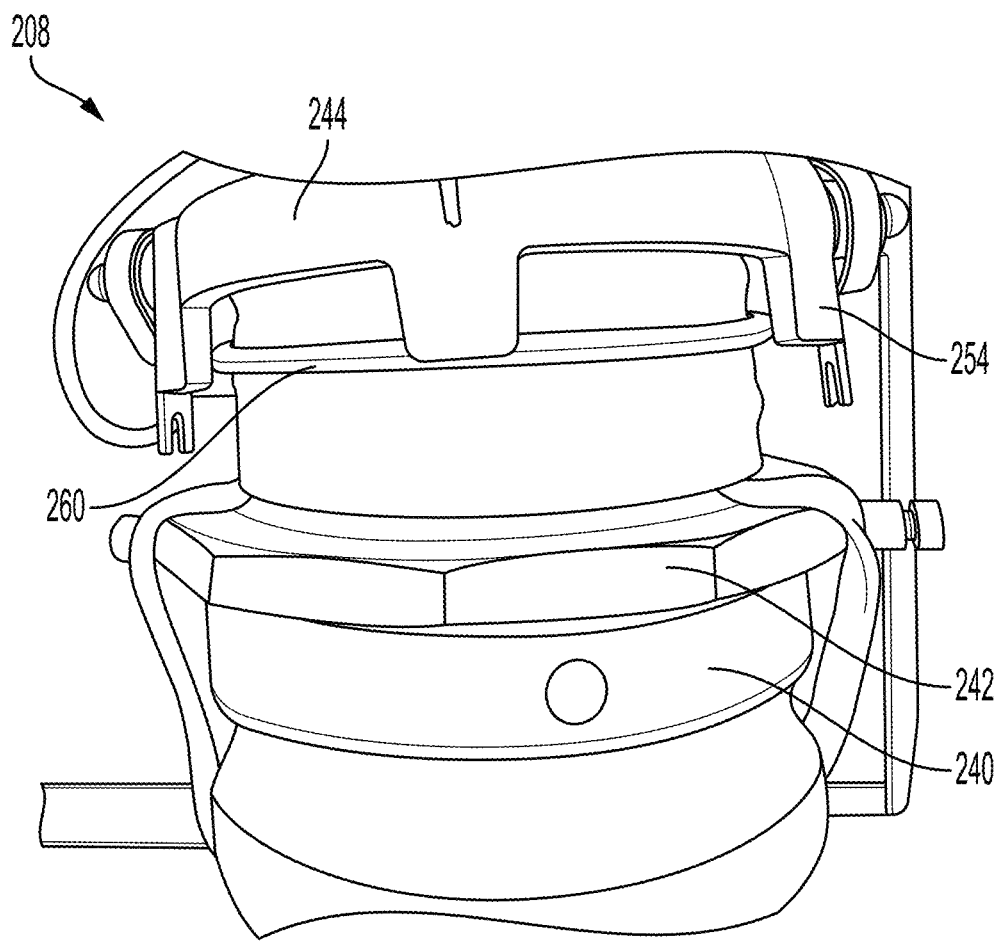
FIG. 2D is a side view of the coupling of the system of FIG. 2A, the coupling shown with a neck of the inflatable structure between a yoke and a body of the coupling and a seal on the neck of the inflatable structure.
Figure 2E:
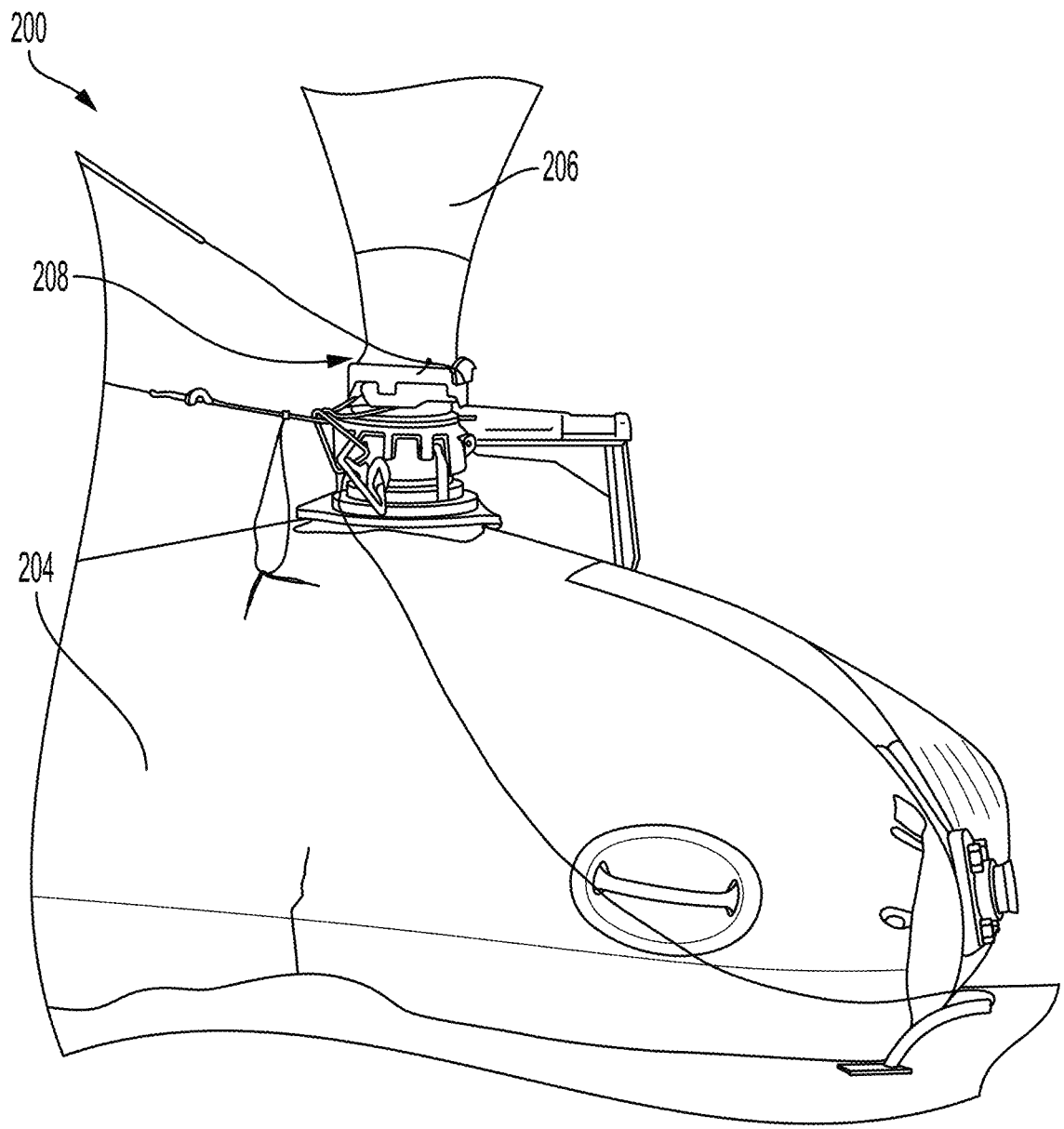
FIG. 2E is a perspective view of the system of FIG. 2A at a first time-step ($t=t_1$) of launching the inflatable structure using lifting gas generated in the reactor.
Figure 2F:
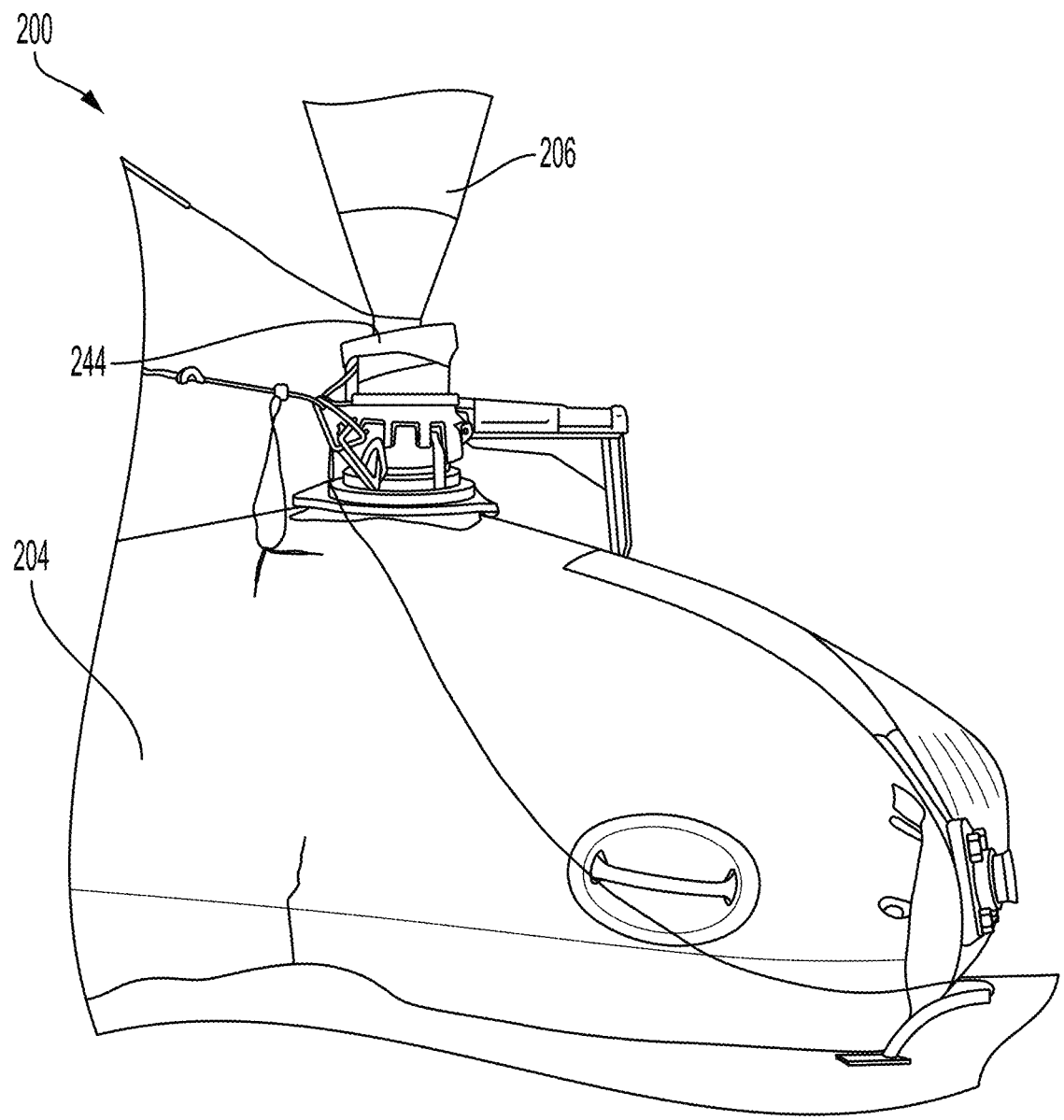
FIG. 2F is a perspective view of the system of FIG. 2A at a second time-step ($t=t_2$) of launching the inflatable structure using lifting gas generated in the reactor.
Figure 2G:
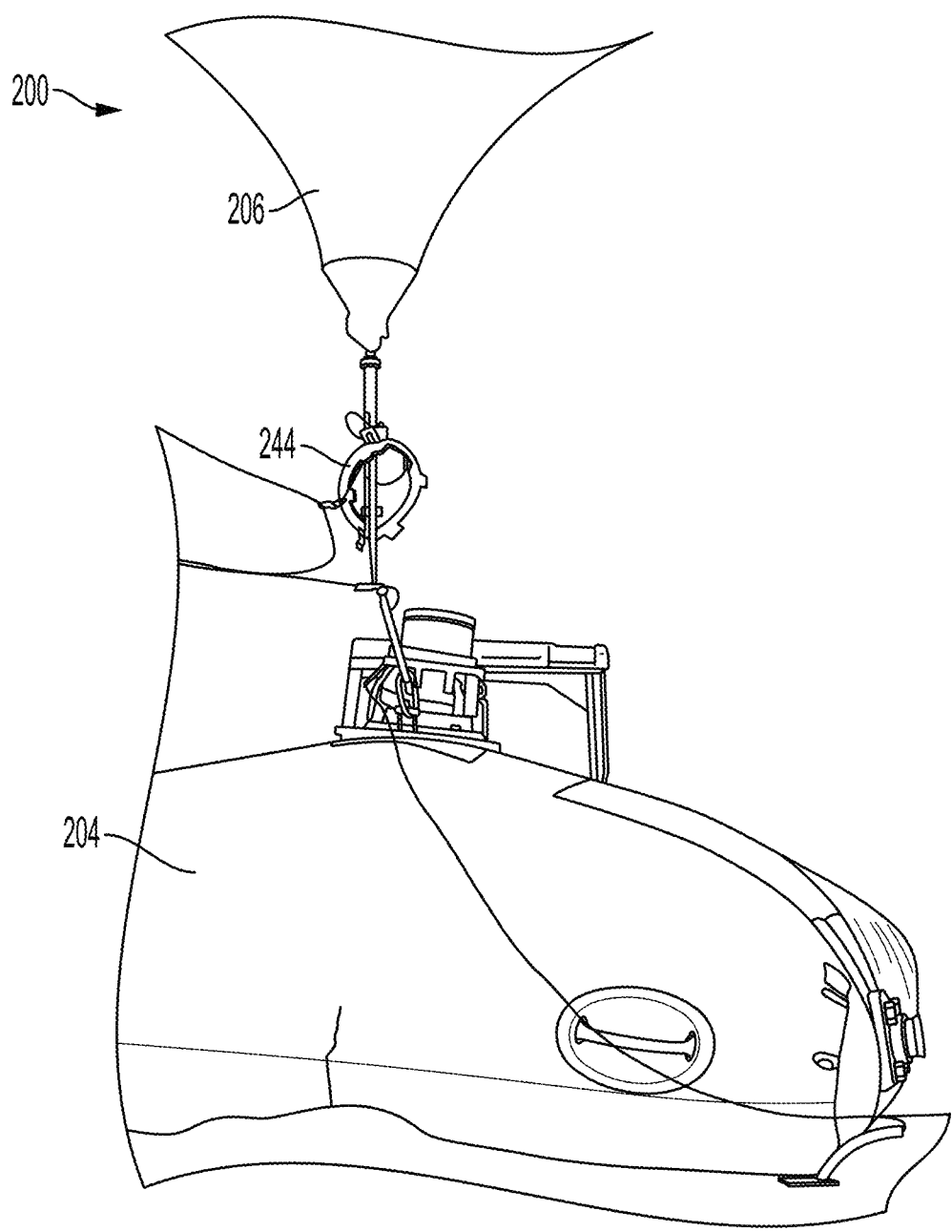
FIG. 2G is a perspective view of the system of FIG. 2A at a third time-step ($t=t_3$) of launching the inflatable structure using lifting gas generated in the reactor.

FIGS. 2E-2G show a temporal sequence of release of the inflatable structure 206 from the coupling 208 when the latch 280 is released to release the yoke 244. As shown in FIG. 2E, at first time step ($t=t_1$), the coupling 208 holds the inflatable structure 206 in place as lifting gas from the reactor 204 fills the inflatable structure 206. As shown in FIG. 2F, at a second time step ($t=t_2$), the latch 280 has been released to release the yoke 244 and the inflatable structure 206 is beginning to lift away from the coupling 208 under the force of buoyancy of the inflatable structure 206. As shown in FIG. 2G, at a third time step ($t=t_3$), the inflatable structure 206 has separated from the coupling 208, and the yoke 244 is separated from the body 240 such that the inflatable structure 206 may be released to fly away and the yoke 244 may fall to the ground.

While inflatable structures have been described as being fillable using a single flow path of lifting gas from a reactor into the respective inflatable structure, it shall be appreciated that other approaches are additionally, or alternatively, possible.

Figure 3:
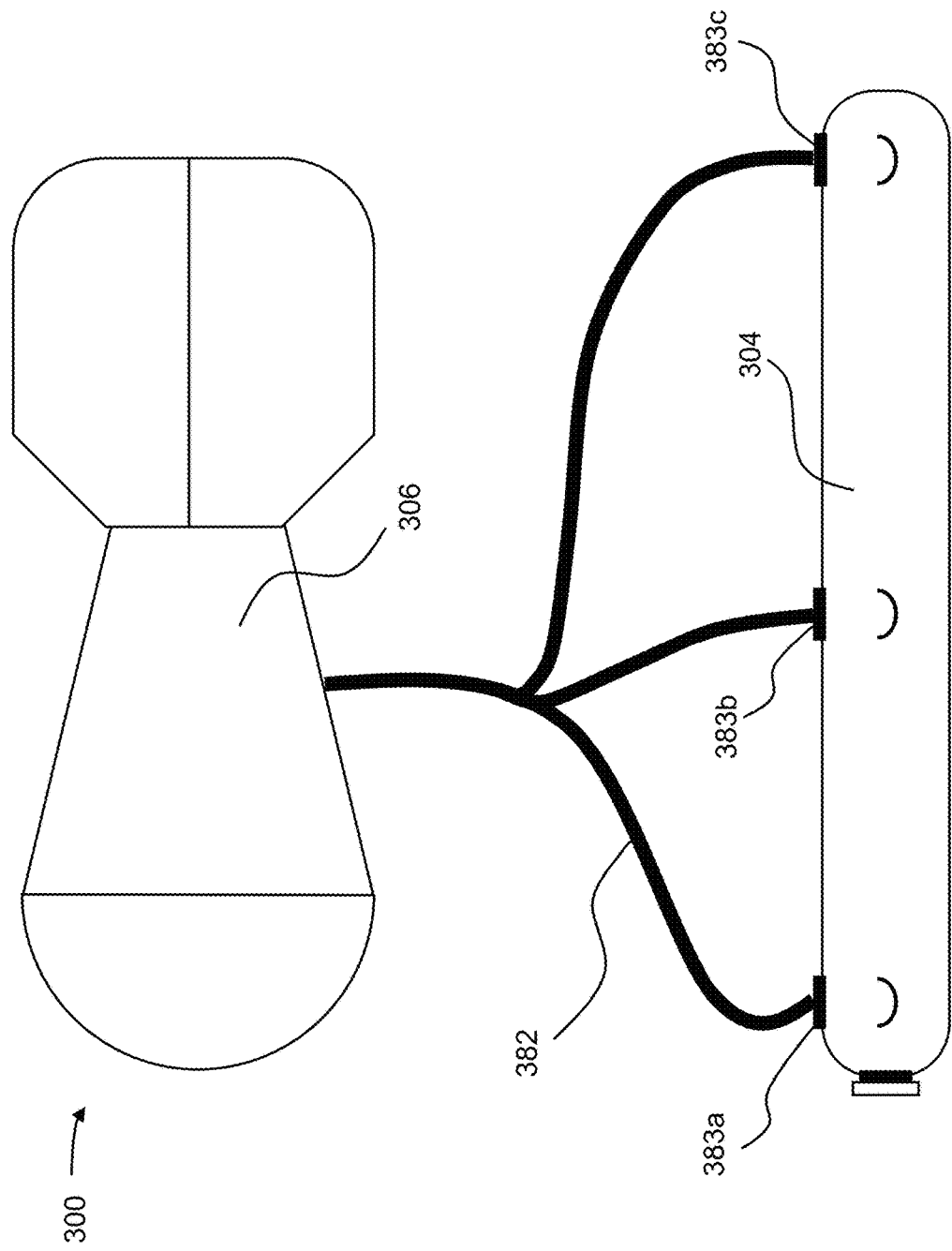
FIG. 3 is a schematic representation of a system for launching an aerostat, the system including a reactor, an inflatable structure, and a manifold.

Referring now to FIG. 3, a system 300 for large-scale hydrogen generation (e.g., capable of producing more than 15 cubic meters of hydrogen-containing lifting gas) to fill an inflatable structure 306. The system 300 may include a reactor 304 and a manifold 382. The reactor 304 having a plurality of outlet ports 383a, 383b, and 383c in fluid communication with the manifold 382, and the manifold 382 may be in fluid communication with the inflatable structure 306. The inflatable structure 306 may be formed of a non-resilient material (e.g., Mylar). The reaction of activated aluminum and water may be carried out with a large excess of water (e.g., greater than 40:1 ratio of water to activated aluminum by mass) to reduce or even eliminate steam generated by the reaction, as may be useful for reducing the potential for damaging the inflatable structure 306 as a result of carrying excess weight of condensed water due to the large surface area of the inflatable structure 306. The multiple outlet ports 383a, 383b, 383c may increase the flow area leaving the reactor 304 while reducing the needs to use large-diameter hose or tube sizes.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. A system for launching an aerostat, the system comprising:
   a reactor defining a chamber, the reactor withstanding temperatures and pressures associated with forming hydrogen-containing lifting gas through reaction of activated aluminum and water;
   an inflatable structure including a balloon and a neck, the balloon and the neck collectively defining a volume;
   a coupling defining a passage in fluid communication between the chamber of the reactor and the volume of the inflatable structure, the passage defining a longitudinal axis; and
   a collar supported on the reactor, the collar defining an orifice in fluid communication between the chamber of the reactor and the passage of the coupling, and the collar releasably restricting displacement of the passage of the coupling, the volume of the inflatable structure, and the chamber of the reactor relative to one another along the longitudinal axis.

2. The system of claim 1, wherein the collar is independently releasable from mechanical engagement with each one of the coupling and the inflatable structure.

3. The system of claim 1, wherein the coupling includes a body, a rim, and a yoke, the body having a first end portion and a second end portion, the passage defined by the body from the first end portion to the second end portion, the rim disposed along the first end portion and releasably coupled to the collar, and the yoke disposed along the second end portion and releasably coupled to the collar.

4. The system of claim 3, wherein the collar includes a plurality of cam locks, each cam lock including a respective cam, and each cam releasably engageable with the rim to secure the coupling in fluid communication with the chamber of the reactor via the orifice defined by the collar.

5. The system of claim 3, wherein the collar defines a recess, the yoke includes a pin extending radially away from the second end portion of the body of the coupling, and the pin positionable in the recess of the collar and, with the pin positioned in the recess, rotation of the yoke restricted about the longitudinal axis.

6. The system of claim 5, wherein the collar further comprises an arm movable from a first position over the recess to a second position away from the recess, the arm in the first position, with the pin positioned in the recess, restricting axial movement of the yoke in a direction away from the recess, and the yoke movable in the direction away from the recess with the arm in the second position and the pin positioned in the recess.

7. The system of claim 6, further comprising a motor mechanically coupled to the collar, the motor actuatable to move the arm from the first position over the recess to the second position away from the recess.

8. A system for launching an aerostat, the system comprising:
   a reactor defining a chamber, the reactor withstanding temperatures and pressures associated with forming hydrogen-containing lifting gas through reaction of activated aluminum and water;
   an inflatable structure including a balloon and a neck, the balloon and the neck collectively defining a volume;
   a coupling defining a passage in fluid communication between the chamber of the reactor and the volume of the inflatable structure, the passage defining a longitudinal axis; and
   a collar supported on the reactor, the collar defining an orifice in fluid communication between the chamber of the reactor and the passage of the coupling, and the collar releasably restricting displacement of the passage of the coupling, the volume of the inflatable structure, and the chamber of the reactor relative to one another along the longitudinal axis; and a valve including a funnel, a float, and a tube, wherein the funnel is disposed in the volume of the inflatable structure, the tube is coupled to an apex portion of the funnel, the tube defines a channel, the float is movable in the funnel to control fluid communication between the funnel and the channel of the tube, and the tube extends from the volume of the inflatable structure and into the chamber of the reactor via the orifice of the coupling.

9. The system of claim 8, wherein the tube defines one or more radial holes axially spaced from the apex portion of the funnel, the one or more radial holes in fluid communication with the channel.

10. The system of claim 8, further comprising a load line mechanically coupled to the funnel, wherein the funnel is movable within the volume of the inflatable structure with the volume of the inflatable structure in fluid communication with the chamber of the reactor via the passage of the coupling, and the funnel is seatable in the neck of the inflatable structure via load on the load line.

11. The system of claim 8, wherein the reactor further includes at least three legs disposed in the chamber, the at least three legs supporting the collar to maintain a minimum height dimension of the chamber of the reactor, and each one of the at least three legs is longer than the tube of the valve to support the tube of the valve in the chamber, away from surfaces of the reactor.

12. The system of claim 8, wherein the valve further includes a rod and a cap, the rod has a first end section and a second end section, the first end section of the rod is coupled to the float, the second end section of the rod is coupled to the cap, at least a portion of the rod between the first end section and the second end section is disposed in the channel of the tube and movable within the channel of the tube, and the cap on the second end section of the rod limits axial movement of the rod within the tube to limit axial movement of the float within the funnel.

13. The system of claim 12, wherein the rod has an outer diameter less than about two-thirds of an inner diameter of the tube.

14. The system of claim 12, wherein the valve includes a sleeve disposed about the second end section of the rod, wherein the sleeve restrains radial movement of the rod within the channel while permitting axial movement of the rod within the channel.

15. A system for launching an aerostat, the system comprising:

a reactor defining a chamber;

an inflatable structure including a balloon and a neck, the balloon and the neck collectively defining a volume;

a coupling including a body and a yoke, the body defining a passage in fluid communication between the chamber of the reactor and the volume of the inflatable structure, the neck of the inflatable structure disposed between the yoke and the body, and the yoke and the neck defining an annular cavity therebetween; and a seal supported on the neck of the inflatable structure, the seal movable into the annular cavity as buoyancy of the inflatable structure pulls the neck of the inflatable structure upward, wherein the seal is an O-ring rollable on an outside surface of the neck of the inflatable structure to move into the annular cavity defined between the yoke and the neck of the annular cavity.

16. The system of claim 15, wherein a first interface between the inflatable structure and the seal has a first coefficient of friction, and a second interface between the inflatable structure and the coupling has a second coefficient of friction less than the first coefficient of friction.

17. The system of claim 15, wherein the coupling includes a rim supported on the body and releasably secured in mechanical communication with the reactor, the yoke includes a plurality of standoffs circumferentially spaced from one another and engageable with the rim to limit axial movement of the yoke toward the rim with the seal supported on the neck of the inflatable structure.

18. The system of claim 17, wherein the coupling includes at least one peg extending radially away from the rim, and at least one of the standoffs defines a respective slot positionable about the at least one peg to key the yoke to a circumferential position with respect to the rim.

19. The system of claim 18, further comprising a latch supported on the yoke, wherein the latch is releasably engageable with the at least one peg and, with the latch releasably engaged with the at least one peg, axial movement of the yoke limited in a direction away from the rim of the coupling.

* * * * *